(12) United States Patent
Herde et al.

(10) Patent No.: US 8,234,135 B2
(45) Date of Patent: *Jul. 31, 2012

(54) ONLINE WAITING ROOM SYSTEM, METHOD AND COMPUTER PROGRAM PRODUCT

(75) Inventors: Patrick Herde, Hollywood, FL (US); Bill Binenstock, Hollywood, FL (US); Antonio Fernandez, Pompano Beach, FL (US); John R. Hopwood, Denver, CO (US); Terrence Lee, Norwalk, CT (US); Steve Snyder, Coral Springs, FL (US); Kar Loong Wong, Fort Lauderdale, FL (US); Natalle Adams, Davie, FL (US); Ronnie Paskin, Plantation, FL (US); Louis Thomas, Coral Springs, FL (US); Brijesh Sutaria, Tamarac, FL (US); Daniel L. Smith, Pompano Beach, FL (US); Fausto Albamonte, Greensboro, NC (US); Christopher M. Kerlin, Fort Lauderdale, FL (US)

(73) Assignee: CBS Interactive, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/314,711

(22) Filed: Dec. 8, 2011

(65) Prior Publication Data

US 2012/0084353 A1 Apr. 5, 2012

Related U.S. Application Data

(63) Continuation of application No. 11/669,883, filed on Jan. 31, 2007, now Pat. No. 8,095,400.

(60) Provisional application No. 60/778,945, filed on Mar. 6, 2006.

(51) Int. Cl.
 *G06Q 10/00* (2012.01)
(52) U.S. Cl. .......................................... 705/5; 705/7.11
(58) Field of Classification Search .............. 705/5, 7.11
 See application file for complete search history.

(56) References Cited

U.S. PATENT DOCUMENTS

| | | | |
|---|---|---|---|
| 6,125,173 A * | 9/2000 | Jagadish et al. | 379/114.1 |
| 6,430,537 B1 * | 8/2002 | Tedesco et al. | 705/7.22 |
| 6,829,583 B1 * | 12/2004 | Knapp et al. | 705/5 |
| 2002/0026398 A1 * | 2/2002 | Sheth | 705/37 |
| 2002/0049086 A1 * | 4/2002 | Otsu | 463/42 |
| 2002/0107965 A1 * | 8/2002 | Piccionelli | 709/225 |
| 2003/0102956 A1 * | 6/2003 | McManus et al. | 340/5.2 |
| 2003/0195753 A1 * | 10/2003 | Homuth | 705/1 |
| 2004/0158494 A1 * | 8/2004 | Suthar | 705/15 |
| 2005/0175167 A1 * | 8/2005 | Yacoub et al. | 379/265.13 |

* cited by examiner

*Primary Examiner* — Kevin Flynn
(74) *Attorney, Agent, or Firm* — Kacvinsky Daisak, PLLC

(57) ABSTRACT

An exemplary embodiment of the present invention sets forth a system, method and computer program product which may include providing an online waiting room and gatekeeper for controlling access to users in a plurality of tiered classification standby lines, seeking access to an online event.

20 Claims, 30 Drawing Sheets

FIG. 1

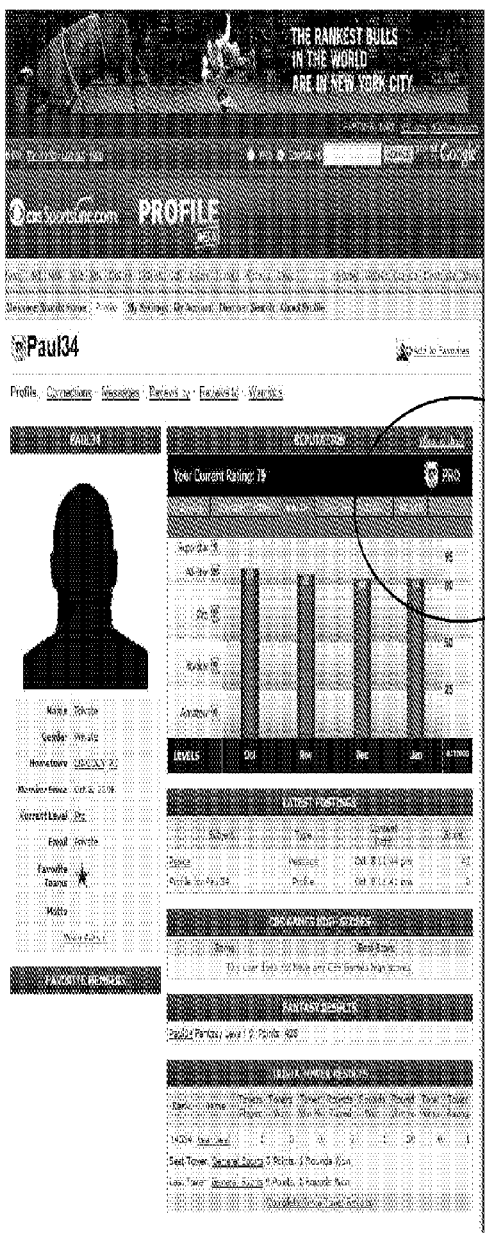
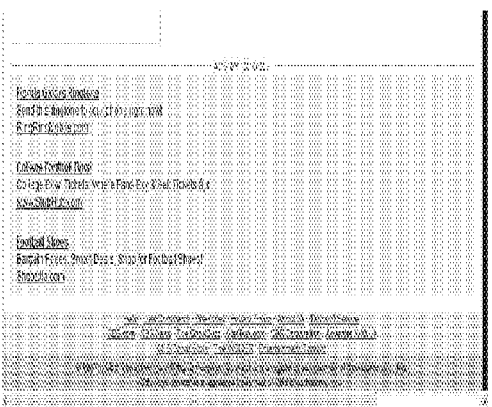
FIG. 16C
1660

1700

| Member Reputation Categories | | | | |
|---|---|---|---|---|
| I (1702) | II (1704) | III (1706) | IV (1708) | V (1710) |
| ▪Message Boards<br>▪Basic Avatar | ▪Message Boards<br>▪Basic Avatar | ▪Message Boards<br>▪Basic Avatar | ▪Message Boards<br>▪Basic Avatar | ▪Message Boards<br>▪Basic Avatar |
| | ▪Purchase History<br>▪Custom Avatars | ▪Purchase History<br>▪Custom Avatars | ▪Purchase History<br>▪Custom Avatars | ▪Purchase History<br>▪Custom Avatars |
| | | ▪Message Boards<br>▪Basic Avatar | ▪Message Boards<br>▪Basic Avatar | ▪Message Boards<br>▪Basic Avatar |
| | | | ▪Online Buddy List<br>▪Create Custom Groups<br>▪Additional Avatar<br>▪Create MB Thread<br>▪Create Glog | ▪Online Buddy List<br>▪Create Custom Groups<br>▪Additional Avatar<br>▪Create MB Thread<br>▪Create Glog |
| | | | | ▪Behavior Recommends<br>▪Monthly Discounts<br>▪Personal Calendar<br>▪3rd Avatar |

|  Amateur (1752) |  Rookie (1754) |  Pro (1756) |  All-Star (1758) |  Superstar (1760) |
|---|---|---|---|---|
| Exemplary Member Reputation Levels & Benefits |||||
| • 1 Warn/Day<br>• Meez or Default Avatar<br>• Rate a Post<br>• Create a Post<br>• Add a Favorite Member | • 3 Warns/Day<br>• Meez or Default Avatar<br>• Rate a Post<br>• Create a Post<br>• Add a Favorite Member | • 10 Warns/Day<br>• Meez or Default Avatar<br>• Rate a Post<br>• Create a Post<br>• Add a Favorite Member | • Unlimited Warns/Day<br>• Meez or Default Avatar<br>• Rate a Post<br>• Create a Post<br>• Add a Favorite Member | • Unlimited Warns/Day<br>• Meez or Default Avatar<br>• Rate a Post<br>• Create a Post<br>• Add a Favorite Member |
|  | • Create a Thread<br>• Create a Poll | • Create a Thread<br>• Create a Poll | • Create a Thread<br>• Create a Poll | • Create a Thread<br>• Create a Poll |
|  |  | • Add "Smilies" to Posts<br>• Add images to Posts | • Add "Smilies" to Posts<br>• Add images to Posts | • Add "Smilies" to Posts<br>• Add images to Posts |
|  |  |  | • Upload Custom Avatar<br>• Create Blog | • Upload Custom Avatar |
|  |  |  |  | • Superstar Glogging |

FIG. 17B

ONLINE WAITING ROOM SYSTEM, METHOD AND COMPUTER PROGRAM PRODUCT

CROSS-REFERENCE TO RELATED APPLICATIONS

This application is related to and is a continuation of U.S. patent application Ser. No. 11/669,883, entitled, "Online Waiting Room System, Method & Computer Program Product", filed on Jan. 31, 2007, the contents of which are incorporated herein by reference in their entireties.

BACKGROUND OF THE INVENTION

1. Field of the Invention

Generally, the present invention relates to online events, and more specifically to online broadband digital broadcast video events.

2. Related Art

Content of various types, such as, e.g., but not limited to, video content, related to an event is often accessible online. An example of such content is a digital video feed such as, e.g., streaming video content. Even today in the world of digital video recorders (DVRs) and Podcasts, audiences generally still prefer to view some types of events live, such as, e.g., late breaking news events and live events such as weather broadcasts, interviews, sporting events, the OSCARS®, and the like. In certain cases, when a large number of users all desire to access the same online broadcast event, all at the same time, individual performance may degrade caused by limited resources such as bandwidth constraints, for example. Conventionally, very large numbers of concurrent users to such an online event, can cause a website to become disabled from excessive resource demands. Thus, solutions have been sought to provide concurrent access to such broadcast content while delivering an acceptable level of user access time, and response time. Limited bandwidth and other network resources have required content providers to develop ways to meter user access to the resources, to ensure acceptable enduser performance. One exemplary conventional method of metering access has been via requiring fee-based subscriptions. For example, the Wall Street Journal's online service wsj.com conventionally limits access to its site to users by charging a fee to users. A fee-based registration system may be used to provide access to subscribers, which have registered. A registration-based system requires that sufficient bandwidth resources be available, or risks dissatisfying registered users. Thus, excess resources may go unused when registered users do not actually attempt to access the online content for which they are registered. Another shortcoming of fee-based registration is that fees must be paid by users, so this may limit an audience to a smaller number than supportable by the technology and network resources such as, e.g., bandwidth, available.

Capacity Comparisons Industry "High-Water Marks"

Historically, CBS SportsLine® has been providing online access to events such as, e.g., but not limited to, the NCAA Mens' Basketball tournament, referred to herein as the March Madness on Demand ("Paid MMOD"). Recent volumes of concurrent users for large online events include the following:

A widely heralded online broadcast by retailer VICTORIA'S SECRET® in 1999, prepared for 500,000 peak simultaneous concurrent users but the website became disabled for many users upon access by the 0.5 million viewers.

During the Chinese TV Chinese New Year Celebration on Feb. 8, 2005, 132,000 peak simultaneous users (handled by Speedera, now part of Akamai), accessed the celebration.

On Jul. 2, 2005, greater than 5 million viewers, 175,000 peak simultaneously (using almost 70 Gb of network capacity) accessed America Online's (AOL's) Live 8—http://theage.com.au/articles/2005/07/06/1120329474555.html.

During Yahoo.com's Dec. 16, 2005 Howard Stern Sirius Radio event—http://biz.yahoo.com/bw/051221/20051221005197.html?.v=1, used 4.4M video streams, and 214,000 peak simultaneous concurrent accesses.

During a March 2006, FREE March Madness on Demand (MMOD) event of CBS SportsLine.com, peak accesses occurred on March $16^{th}$ and $17^{th}$, it was planned that 200 k-300 k peak simultaneous 400 kbps video streams were served, for a total of ~100 gbps peak bandwidth.

Thus, an improved method of providing access to an online event supporting large numbers of simultaneous concurrent users is needed that overcomes the shortcomings of conventional solutions.

SUMMARY OF THE INVENTION

Exemplary embodiments of the present invention set forth various methods, systems and computer program products for providing multiple level online standby queues, controlling access to network resources and content according to an exemplary embodiment.

An exemplary embodiment of the present invention may include a system, a method or a computer program product for providing an online waiting room. In an exemplary embodiment, a method may include: a) providing an online waiting room for an online event;

b) placing users in a line of a plurality of standby lines, wherein each of the plurality of standby lines is associated with a corresponding user classification tier of access to the online event; and c) providing a graphical representation of all of the plurality of standby lines, which is computer-viewable by users in the standby lines.

In an exemplary embodiment, the method may include where the online event may include at least one of: content, audio content, video content, movie content, a broadcast, a digital broadband broadcast, a video, an audio, a movie, a streaming audio, a streaming video, streaming content, a live event, a sporting event, a news event, an entertainment event, a concert, a show, a performance, a movie, an awards show, an online event, a game, a video game, a business to business seminar, a seminar, an organizational meeting, a conference, a video conference, a multi-tiered tournament, an interview, an interview with a famous person, and/or a massively multiplayer online (MMO) game.

In another exemplary embodiment, the method may include where the plurality of lines comprise at least one of: a standard access (SA) line; a premier access (PA) line; a guaranteed access (GA) line; a lower class line; a medium class line; an upper class line; a general admission line; a registered user line; a guaranteed line; a red carpet line; a fast pass line; a premium line; an express checkout line; a reputation based line; an individual reputation points level based line; and/or a self-serve line.

In an exemplary embodiment, the method may further include d) allowing at least one user in the line to invite at least one additional user to the event.

In an exemplary embodiment, the method may further include at least one of: d) providing an indication of at least one of growth and/or rate of growth, of each of the lines; e) providing an indication of at least one of movement and/or rate of movement, of each of the lines; f) providing an indication of where in the line the user is; g) providing an indication of where in another of the lines, the user would have been had the user been in the another of the lines; h) communicating where a user is in line and where the user would be if in another of the lines; i) providing a boss button may include at least one of turning off sound and/or minimizing viewer; j) providing a value adding experience while the user waits may include at least one of: providing scores; providing communication; providing alerts; providing chat; and/or providing a game; and/or k) providing a user experience differentiator.

In an exemplary embodiment, the method may include where the graphical representation may include at least one of: a graphical rendering; an image; a video image; an animated image; a graphical representation of a venue; a multi-dimensional indication; a two-dimensional indication; a three-dimensional indication; a graphical representation of people in line; a graphical representation of an avatar; a graphical representation of a stadium; a graphical representation of a concert hall; a graphical representation of a night club; a graphical representation of an awards show; a graphical representation of an auditorium; an image of a red carpet; an image of a turnstile; and/or an image of a velvet rope.

In an exemplary embodiment, the method may include where the event may include on demand broadband access to streaming video of at least one of: a sporting event.

In an exemplary embodiment, the method may include where the event may include online access to at least one of a sporting, an entertainment, and/or a news event.

In an exemplary embodiment, the method may include where the event may include at least one of a game, a game without consideration, a game of skill or chance, and/or a massively multiplayer online (MMO) game.

In an exemplary embodiment, the method may further include at least one of: allowing the at least one user to invite a plurality of additional users to the event at one time; allowing the at least one user to maintain a buddy list of the additional users; and/or allowing the at least one user to track the location in the lines of the additional users of the buddy list.

In an exemplary embodiment, the method may include where the (b) may include at least one of: providing a countdown to expected entry clock to the user; providing an indication of a position of the user in the line; and/or providing an indication of a position of the user, had the user been in another line of the plurality of lines than the line.

In an exemplary embodiment, the method may include where the (b) may include at least one of: controlling access to the online event by prioritizing user access to the online event; managing the lines; manipulating the lines; slowing down and/or speeding up the lines; managing access; bouncing users in the lines if acting outside rules; managing access based on user classifications; managing what happens in the online waiting room; facilitating alerts; creating alerts; providing content; providing scores; providing polls; managing polls; providing value added content; managing ads; providing user communication; providing individual access; providing single user access; providing single user access dependent upon reputation; managing a reputation engine; managing group user access; managing tier user access; and/or managing individual user access.

In an exemplary embodiment, the method may include where the (b) may include at least one of: placing each user in one line of the plurality of standby lines, wherein the user classification tier of access may include at least one of a standard access (SA), a premier access (PA), a guaranteed access (GA); and/or a reputation based access.

In an exemplary embodiment, the method may include where the graphical representation may include an indication of the standby lines may include at least one of: an audio indication, a video indication, a graphical indication, a two-dimensional indication, a three-dimensional indication, an animated indication, an image indication, an alert indication, a communication indication, a browser based popup indication, an instant message based indication, and/or an email based indication.

In an exemplary embodiment, the method may further include allowing an immediate reserved access to the online event to the GA user; allowing a medium level access to the online event to the PA user; allowing a lower level of access to the SA users.

In an exemplary embodiment, the method may include where the medium level of access provides a shorter wait in the line as compared to a wait for the lower level of access.

In an exemplary embodiment, the method may include where the user may request to move to a higher level of access than a current user access level.

In an exemplary embodiment, the method may include where the user pays a fee to a service provider to become the higher level of user.

In an exemplary embodiment, the method may include where at least one of: the user may perform a task to move to the higher level of access; and/or the user's reputation may move the user to the higher level of access.

In an exemplary embodiment, the method may include where the task may include at least one of: registration, and/or entering a user reputation profile.

In an exemplary embodiment, the method may include where the users may communicate with one another via at least one of: a buddy list; a chat room; an instant message; an email; a mobile message; a short message system (SMS) message; a wireless platform communication message; a telephony message; and/or a VoIP connection.

In an exemplary embodiment, the method may include where the user is provided a capability may include allowing configuring of an avatar corresponding to the user.

In an exemplary embodiment, the method may further include at least one of: providing advertising to users waiting in the line; providing scores of sporting events to those in the line; providing content to users in the line; providing a game to users in the line; providing at least one of audio, video, animation, and/or textual data to users in the line; providing at least one of an email, an instant message, a short message system (SMS) message, a multimedia messaging service (MMS) and/or a wireless notification to users in the line; providing an invitation to move to a higher level of access to users in the line; providing relative wait times list of the performance of the top ten of the at least one participants; providing a value added service to users; providing a wine bar to users may include an opportunity to purchase goods and/or services; providing a game; providing a news ticker; providing a content ticker; and/or providing a relatively low bandwidth service as compared to the online event.

In an exemplary embodiment, the method may further include at least one of: providing an advertisement (ad) during at least one of: before, during, and/or after the user is waiting in the line; providing a banner ad; providing a video ad; providing an audio ad; providing an animated ad; providing content; providing audio content; providing video content; providing customized ads; and/or providing customized ads based upon at least one of user tier, user reputation and/or user status.

In an exemplary embodiment, the method may further include providing a schedule of a future event.

In an exemplary embodiment, the method may further include providing users an opportunity to register in advance to be included in one of the plurality of standby lines.

In an exemplary embodiment, the method may include where the enabling a third party may include at least one of a business, an individual, a consumer, a charity, and/or an entity, to use the online waiting room may include at least one of: receiving a selection of a skin option; enabling a customizeable mod including a graphical representation of venue; personalizing a user experience; providing for personalization of the user experience, wherein a level of personalization is dependent based upon an individual user profile and/or reputation; receiving a third party ad; receiving a fee from the third party; receiving avatar configuration information from a user; receiving options for customization of the online waiting room; receiving a setup for the waiting room; receiving a number of standby lines and rules for allowing entry to the online event by users of the standby lines; receiving a request for content to be displayed to users in the waiting room; and/or sharing revenue with the third party.

In an exemplary embodiment, the method may further include enabling collaboration between two or more users of the online waiting room may include providing at least one of: a billboard; a short message system (SMS); a wireless message; a multimedia message; a multimedia message system (MMS) message; a mobile message; an invitation to a friend; an email to a friend; a message; a notification; an alert; an internet message; a BLOG; a message board; an Internet chat session; an instant message; a chat room; an email; and/or a voice-over Internet Protocol (VoIP) session.

In an exemplary embodiment, the method may further include providing an application enabling provision of at least one of the online waiting room and/or a game to be played by users while waiting in the online waiting room, the application providing at least one of: a message; a program on a computer readable medium, a downloadable program, an applet, a web-enabled application, a mobile application, BREW application; a networked application; a massively multimedia (MMO) and/or a JAVA application.

In an exemplary embodiment, the method may include where the method is performed on at least one of: a browser-based system; a standalone workstation-based system; a client-server based system; a server-based system; and/or an application service provider (ASP)-based system.

In an exemplary embodiment, the method may include where the method is used for providing indications of at least one of upselling user access, products, services, browsing to buy, tiers, and/or offers to access products and/or services.

In an exemplary embodiment, the method may include where the method may be an invitation method may include attracting additional users may include at least one of: inviting users to a future event; attracting non-registered new subscribers; attracting traffic from existing subscribers; attracting affinity participation; attracting activity; attracting visitors to a website; attracting demand for content; attracting page hits; attracting page use; attracting sponsorship; attracting advertising; driving brand recognition; and/or attracting live people.

In an exemplary embodiment, the method may include where the users being attracted are being attracted to at least one of: an online content registration; an online content subscription; an advertisement (AD); a website; a broadcast; a program; content; a viewing of content; a future event; and/or playback of content.

In an exemplary embodiment, the method may further include providing users entertainment while the users are waiting in the standby lines of the online waiting room may include at least one of: providing value added services; providing a boss button; providing a boss button after entering a waiting room; providing a fact-related game; providing an entertainment related game; providing a content related game; providing a movie content related game; providing a music content related game; providing a television content related game; providing a sports related game; providing a current events related game;

providing a news related game; providing a trivia game; providing a sports trivia game; providing an entertainment trivia game; providing a movie trivia game; providing a television trivia game; providing a television program trivia game; providing games; providing incentives; providing casual games; providing history games; providing educational games; providing entertainment games; providing skill games; providing card games; providing board games; providing arcade games; providing games with incentives; providing mobile games; and/or providing a broadcast trivia game.

In an exemplary embodiment, the method may further include ensuring a user in line corresponds to a unique real person may include: requiring the participants to perform at least one of: requiring a user to respond with an expected response to a prompt or returning the user to the back of the line; registering as a participant; registering at least one of an email, a username, a password, a first name, last name, and/or personally identifiable information; performing a reverse Turing test to indicate a live user; entering a unique indicator of the at least one user; entering a social security number of the at least one user; and/or entering an email address of the at least one user.

In an exemplary embodiment, the method may include where the a) may include providing the online waiting room to at least one of: a computer; a device; a watch; a gaming device; a console; an XBOX 360; a PLAYSTATION (PS/2 or PS/3, or PS/n); a PLAYSTATION PORTABLE (PSP); a NINTENDO WII; a digital video recorder (DVR); a TIVO® personal video recorder; a SLINGBOX; a kiosk; a mobile device; a telephony device; a browser enabled device; a web browser-enabled device; a web device; a computing device; a communications device; a telephony device; an interactive television (iTV) device; a wireless device; a personal digital assistant (PDA) device; a location-based device; and/or a geographic positioning system (GPS) location-based device.

In an exemplary embodiment, the method may further include allowing a user to invite another user to enter the waiting room, wherein the invite may include at least one of: billboard; a short message system (SMS); a multimedia message service (MMS); a mobile message; an invitation to a friend; an email to a friend; a message; a notification; an alert; an internet message; a BLOG; a message board; an Internet chat session; an instant message; a chat room; an email; and/or a voice-over Internet Protocol (VoIP) session In another exemplary embodiment, a system may include an online waiting room server adapted to communicate with a network for communication with a plurality of user devices, the server adapted to manage a plurality of tiered access standby lines of users, adapted to control access by the users to an online event, and adapted to provide a graphical representation of the online waiting room to the users.

In another exemplary embodiment, a system may include means for providing an online waiting room for an online event; means for placing users in a plurality of tiered classification standby lines; and means for controlling access to the online event by the users in accordance with rules associated with each of the plurality of tiered classification standby lines.

In another exemplary embodiment, the system may further include means for allowing at least one user waiting in the online waiting room to invite at least one additional user to join the waiting room.

In yet another exemplary embodiment, a computer readable product embodied on a computer readable medium may include logic which when executed on a computer performs a method may include: providing an online waiting room for an online event; placing users in a line of a plurality of standby lines, wherein each of the plurality of standby lines is associated with a corresponding user classification tier of access to the online event; and providing a graphical representation of all of the plurality of standby lines, which is computer-viewable by users in the standby lines.

In another exemplary embodiment, a method of providing a massively multiplayer online waiting room, may include: receiving users into a plurality of tiered classification standby lines; controlling access to an online event for the users in accordance with rules of access; and prioritizing access to users in a higher tier classification standby line relative to a lower tier classification standby line.

In another exemplary embodiment, the method may include where the controlling access may include at least one of: classifying a user; classifying a user based on payment tier; classifying a user based on reputation; classifying a user based on a sign up date; providing access dependent on a tier of users; providing access dependent upon a group of users; providing access to individual users; providing access to individual users based on user profile reputation; providing access based on a reputation algorithm; and/or providing a profile system measuring user reputation.

BRIEF DESCRIPTION OF THE DRAWINGS

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

Figure 1:
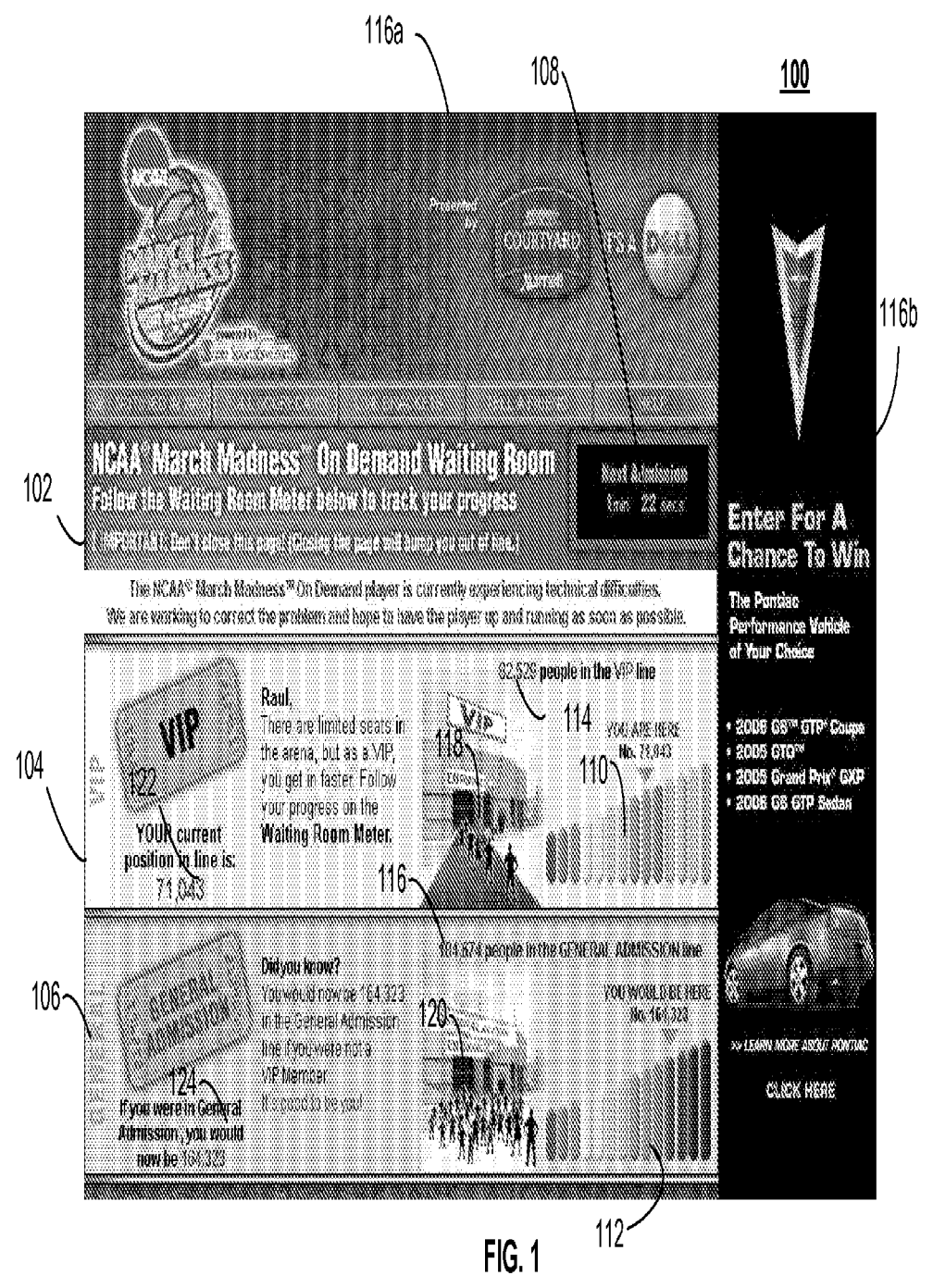

FIG. 1 depicts an exemplary embodiment of a screenshot of an exemplary waiting room graphical user interface (GUI), having a VIP and a general admission queue graphically represented, according to an exemplary embodiment of the present invention;

FIGS. 16A-16C depict exemplary embodiments of exemplary Public Profile pages for exemplary Amateur (FIG. 16A), Rookie (FIG. 16B), and Pro (FIG. 16C) users, respectively, for enabling automatic public viewing of exemplary default information (such as, e.g., but not limited to, Member ID, Reputation, Member Category Level, Favorites and Despised, High Scores in Games, Fantasy Ranking, Trophy Room, and/or the user's Member Created Content, etc.), and optional viewing of other information (such as, e.g., but not limited to, first name, last name, e-mail address, city, state, gender, occupation, Buddy List, etc.), as may be made public, in an exemplary embodiment, by the user if opted in by a user, enabling an exemplary Reputation Engine system according to an exemplary embodiment;

FIGS. 17A and 17B depict exemplary embodiments of an exemplary table of exemplary Member Reputation Categories, Levels, and/or Benefits and/or exemplary category icons, according to an exemplary embodiment;

DETAILED DESCRIPTION OF EXEMPLARY EMBODIMENTS OF THE PRESENT INVENTION

Figure 2:
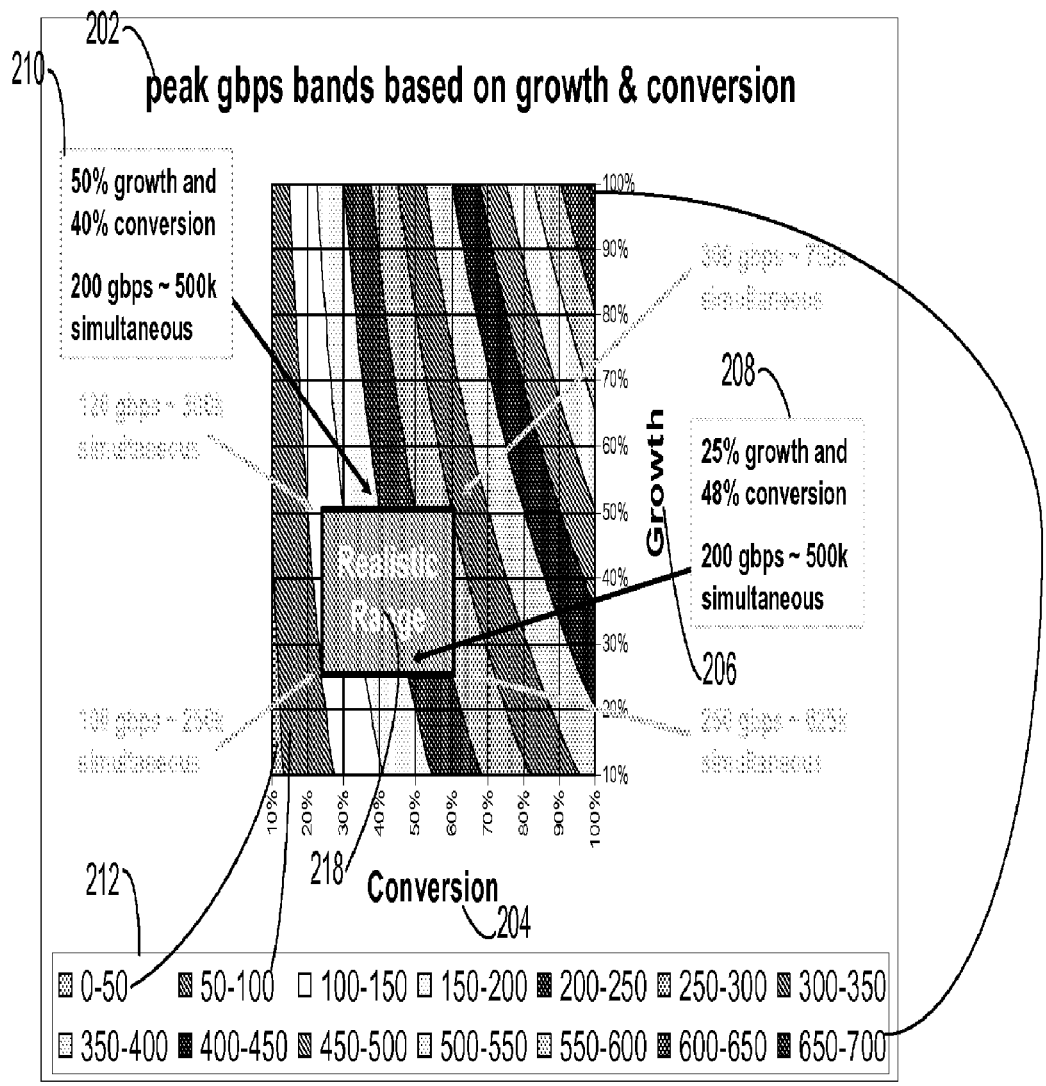
FIG. 2 depicts a grid displaying peak gigabits per second bands based on growth vs. conversion.

Various exemplary embodiments including a preferred embodiment of the present invention are discussed in detail below. While specific exemplary embodiments are discussed, it should be understood that this is done for illustration purposes only. A person skilled in the relevant art will recognize that other components and configurations may be used without parting from the spirit and scope of the invention.
Overview of an Exemplary Embodiment According to an exemplary embodiment of the present invention, an online waiting room may provide an improved method to restrict access to online content. According to an exemplary embodiment, the online event may be an online broadband digital broadcast video and/or streaming video and/or audio content broadcast accessible by a large number of simultaneous users accessing the content from, e.g., but not limited to, a computing device, a computer, a personal computer (PC), a workstation, a laptop, notebook, handheld, palm top device, a personal digital assistant (PDA), a communications device, a telephony device, a mobile phone, a client, a server, a terminal, a local and/or remote device, a wired and/or wireless device, a web-based and/or Internet coupled device, and/or an interactive television (TV) device. According to an exemplary embodiment of the present invention, users may be broken into different classes of viewers. An exemplary lowest class of users may be, in an exemplary embodiment, the general admission class of user, referred to herein as standard access (SA), to avoid confusion with a higher, guaranteed access class of user. In an exemplary embodiment, a higher class of user may be provided, such as, e.g., but not limited to, a medium class of user. In an exemplary embodiment, the medium class of user may be, e.g., but not limited to, a group of registered users, for example, referred to herein as a premiere class (PA) of users. In an exemplary embodiment, an upper class, or a premium class of users, may be a higher class of users, which may include, in an exemplary embodiment, a paying subscriber to a service, referred to herein as a guaranteed access (GA) class of user. According to an exemplary embodiment, the present invention, may visibly and performance-wise differentiate between the different user classes. According to an exemplary embodiment, an upper class of users may be provided, e.g., in an exemplary embodiment, guaranteed access to the event. According to the same exemplary embodiment, the medium PA class of users may be provided a red carpet, VIP line, and/or faster line for entry to the event. According to an exemplary embodiment, the lowest class of user, the SA user class, may be placed in a slower line, a graphical representation of which can be provided via the graphical user interface (GUI) to the user to create interest among SA class users in higher PA and GA user classes, the ability to see the other classes of users and the speed with which a higher class of user can gain access to the event. According to an exemplary embodiment, the relatively higher classes of users, PA and GA user classes, may also be provided a visual feedback of the pace of the lines for the higher classes, relative to the pace of movement of the lines of the lower classes of users. Advantageously, the user interface, by providing visual feedback relating to the advantages or disadvantages of the different classes (GA, PA, and SA) of users, encourages users to, e.g., subscribe, or seek access at a higher user class level, or to register for future events at a higher class of registered users. This effect, drives lower class users toward interest in becoming higher value customers for the web site, content provider and/or content distributor, by visually demonstrating the value of higher user classes of service. In an exemplary embodiment, for a sporting event, users may congregate outside an event in a so-called waiting room, which may include, e.g., in an exemplary embodiment, various queues, which may in an exemplary embodiment be depicted via a graphical representation of, e.g., a wait list, an estimated wait, a parking lot, an atrium, an entrance of a stadium, a concert hall, and/or an auditorium, etc., and graphical representations may be provided of the numbers (graphical or numeric) of people in each line (or class of users), and/or the speed of admission of each line, and/or other representations of the different user classes of service, or entry, and requirements for entry to each line or user class of service, or entry. In an exemplary embodiment, the application software program may act as a metaphorical bouncer to control entry and access to the online event by requiring users to provide requisite credentials to be placed into an appropriate queue, such as, e.g., but not limited to, user registration, password, unique identifier, biometric, authentication, etc. According to an exemplary embodiment, the online waiting room may be used to control access to a limited capacity, multiple concurrent user online event such as, e.g., a broadband, online broadcast, news, and/or sporting event. In another exemplary embodiment, the online waiting room may be used to control online access to a limited capacity, multiple concurrent user, interactive access application, such as, e.g., a live customer service window, such as, e.g., but not limited to, a Voice over Internet Protocol (VoIP) interactive customer service, click-to-talk application for, e.g., but not limited to, a phone company, energy company, department of motor vehicles (DMV), administrative agency, government agency, quasi-governmental agency, business, etc.

An Exemplary Embodiment of a Waiting Room Invention

Since conventionally it has not been possible to accommodate peak simultaneous user demand for live online video content streams, such as, e.g., CBS SPORTS MARCH MADNESS ON DEMAND (MMOD), there is a need to have a means to control (and/or limit) access to the video content streams, while still providing consumers with a positive user experience.

Various alternative solutions have been considered, including the following solutions, according to various exemplary embodiments.

1. Do nothing. User experience, according to an exemplary embodiment, may be implicitly at the mercy of bandwidth capacity of a content distribution network (CDN). If demand is below the total CDN capacity, users get access to video streams via their media player. If demand exceeds total CDN capacity, the users' media players time-out trying to connect to a stream, or, stay in "buffering" state, until demand drops back below capacity.

2. Deny access with an explicit user interaction. User experience, in another exemplary embodiment may be discretely controlled by an entity, such as a broadcast network such as, e.g., but not limited to CBS. Access to the streams may be controlled as a binary state (all comers get access, or no comers get access). The broadcast network or other entity may have the ability to declare that a maximum capacity has been reached, and by setting a binary state indicator in the system, logic in the player may inform subsequent users via a message that capacity has temporarily been exceeded and that the video may not be available. In one exemplary embodiment the message may also suggest a delay time before trying again. The entity may also "clear" the binary state indicator to indicate that capacity has dropped below the maximum, and the player logic may then resume connecting subsequent consumers to streams.

3. Put users into a controlled queuing experience. User experience may be discretely controlled by an entity again, however access to the streams may be controlled via several queues. The entity may have the ability to declare that maximum capacity has been reached, and subsequent users making requests to access streams may be placed into a "waiting room". Controls may exist to allow staff of the entity to manually "admit" users to stream access (i.e., "move" a quantity of consumers from the waiting room to the player), akin to a bouncer at a nightclub allowing very important people (VIPs) in before general admission attendees.

Various exemplary embodiments of the present invention are set forth including variations on the theme presented above, in the latter solution.

Ticketing and Standby Features of an Exemplary Embodiment

An exemplary embodiment of an exemplary ticketing and standby queuing system and method according to an exemplary embodiment may include:

Pioneering a rational business methodology for addressing capacity-constrained, live, online streaming events;

Building long-term asset value into technology, marketing, advertising and subscription sales systems for annual and/or live events such as, e.g., sporting events, concerts, awards ceremonies, etc.;

Creating perceived scarcity of and, thus, behavioral urgency to register for a live online event;

Individuals may register much earlier for a pass to an annual and/or live event (especially subsequently to seeing the system in action), and Influencers may be sure to educate their constituencies so they'll register for theirs;

Due to scarcity, GA pass holders may be more likely to:
Register,
Use their passes and may show up on a site(s) on the day of an event,
Stay longer knowing that the user may be consuming a scarce resource,
Purchase GA passes to escape the lines, and
Learn to pre-register each year for annual type events (thus giving content developers and/or distributors, capacity indications well before the day of the event or games).

In an exemplary embodiment, Scarcity may drive Exclusivity, which in turn may drive Perceived Value, which may encourage Increased Sponsorship $ (with no downside on customer volume).

Technology Operations may include, in an exemplary embodiment may include:

Managing peak bandwidth committing expenses within reasonable bounds;

Managing in-venue and standby crowds with engineered system controls rather than conventional approach of "as much capacity as can be afforded and crossing fingers";

Reducing bottlenecks on registration and log-in systems; and communicating known policies clearly, which may drive a clear Customer Service methodology.

Ticketing and Standby Overview

"Guaranteed Access" (GA) passes may be used to service VIPs as a back door entry into an event such as, e.g., but not limited to, March Madness on Demand (MMOD). Peak capacity headroom (X %) may be reserved to account for all GA ticket holders in an exemplary embodiment. GA capacity headroom (X %) can increase over the course of tournament play in exemplary embodiment. GA ticket holders may not be put into a standby queue unless the situation is NOT WELL, in an exemplary embodiment. If this situation occurs, the system may have specific communication methodologies to, e.g., immediately address all GA ticket holders.

In an exemplary embodiment, GA may be publicly available for purchase pricing and may have the following exemplary pricing tiers:

Full retail, in an exemplary embodiment, 100% (roughly $30);

Early-Bird discount, may buy before earliest deadline (say Feb. 28, 2006 or earlier for an exemplary year 2006 March Madness Tournament event) and may save the most, e.g., 50%;

Pre-Event discount, may buy before an exemplary Selection Sunday of the exemplary tournament event (so, Mar. 11, 2006 or earlier) and may save 25%;

Later-Round discount, may buy after Friday Mar. 17, 2006, and may save 50% (to preserve value of existing GA tickets, an exemplary embodiment may use capacity throttling to make this a reasonable consideration on the part of the customer, i.e. the customer may want to stay out of the standby line);

No low-price (say $6 to $10) a la carte game tickets may be available; and

In an exemplary embodiment, some tangible value may be added by offering to ship a souvenir Final Four program to all GA subscribers within 4-6 weeks of event.

A buffer % (in an exemplary embodiment, e.g., 10%) may be established to account for delays in peak usage data capture and other technology and marketing considerations and the buffer can be set to 0% if not needed.

In an exemplary embodiment, two queues may form when peak simultaneous users exceeds Z %=100%−X %−buffer %:
  a) Premier Standby; and
  b) Standby.
In another exemplary embodiment, less than two, or greater than two queues may form.

In an exemplary embodiment, Y % of customers (e.g., but not limited to, 400% of planned peak simultaneous users) may have "Premier Access" placing them into the Premier Standby queue if the number of simultaneous game day users exceeds, e.g., Z %. Premier Access tickets may be available until: (a) a fixed number runs out, or (b) a set deadline, such as, e.g., or not limited to, a specific date such as, 1 week or a date and time such as, e.g., but not limited to, Wednesday Mar. 15, 2006, 11:59 PM ET. In an exemplary embodiment, an initial allotment of Premier Access passes may be created at about half of an ultimate goal. At a later time, peak capacity may increase and another allotment may be opened of Premier Access passes.

In an exemplary embodiment, all other registrants may be considered "Standard Access" and may be placed in a Standard Standby if the number of simultaneous game day users exceeds, e.g., Z %., in an exemplary embodiment.

TABLE 1

Capacity . . . All Things Considered

| Consideration | Importance | Approach |
| --- | --- | --- |
| Bandwidth commit due to peak simultaneous streams | Drives ability to service demand Drives cost | Manage demand with "ticketing and standby" methodology "Guaranteed Access" ticketing |
| Registration system capacity | Required to collect zip code (for blackouts) Adds uniquely identified customer and email contact info to database | Set-up pre-registration, or "ticketing" system Ticketing system drives urgency for pre-registration campaign. "Don't let your friends get shut out" viral marketing campaign Work around registration spikes for brackets and possibly The TOWER |
| Log-in system capacity | Required to handle log-ins for people who've already registered but have since logged out | What is our capacity here? Is it separate from the registration system? Significant "LOG-IN EARLY . . . HERE'S HOW" consumer messaging well before Thursday 3/16 games |
| Customer service capacity | Help w/forgotten passwords Help w/tech support Help w/standby irritation | Temps Wednesday 3/15 through Sunday 3/19? Possible use Guaranteed Access passes to placate irritated customers (will let Grubbs decide how to handle) |
| Player serving capacity (not the streams, the MMOD player/application) | Getting through all of the hurdles above only to have the player not load quickly would be lame | Just be sure we can handle this for the Thursday and Friday peaks |
| Total bandwidth usage | Drives cost (if we do have partner w/existing commit) | Get as much help as possible from tech partner Let it ride and pay for it out of marketing budget as spending now drives advertiser demand in future years |
| Advertising commitments | Drives current profitability Drives future profitability | We've set the bar pretty low this year based on past MMOD (pay version) ad under-deliveries Don't worry about this now |

A Viewable Exemplary Pre-Registration "Ticketing" Flow

An exemplary ticketing flow may include, in an exemplary embodiment:
  1) Splash page request;
  2) Splash page elements;
  3) Logged-in/out status;
  4) Registration path;
  5) Explanation of "ticketing" process and how it may affect the customer on game/event day;
  6) Email follow-up; and
  7) MINIMUM SYSTEM REQUIREMENTS check (see FIG. 7) (though negative results may not preclude registration and ticketing, in one exemplary embodiment).

An Exemplary Game Day or Event Day Flow (Establishing and Holding Place in Standby Queue)

An exemplary flow may include, in an exemplary embodiment:
  1) MINIMUM SYSTEM REQUIREMENTS check (in one exemplary embodiment, failure may preclude further progress, i.e., the requirements may be "mandatory", in another embodiment these requirements may be "suggested";
  2) MMOD event entry page request (for event/game day);
  3) Logged-in/out status;
  4) Registration path;
  5) Event (e.g., MMOD) entry page elements including percent (of Z %) capacity that may be currently in use;
  6) Direct entry to MMOD streaming or standby queue messaging; and
  7) If placed into a standby queue, clear messaging about:
    Standby queues may be first-in, first-out (FIFO);
    What a user may be required to do to maintain place in line (e.g., but not limited to "KEEP THIS WINDOW OPEN to maintain your place in line") or lose the place in line and the user may be forced to go to the back;
  8) If possible, approximate estimated wait time may be communicated, in an exemplary embodiment.

Exemplary "Waiting Room" Illustration

Figure 4:
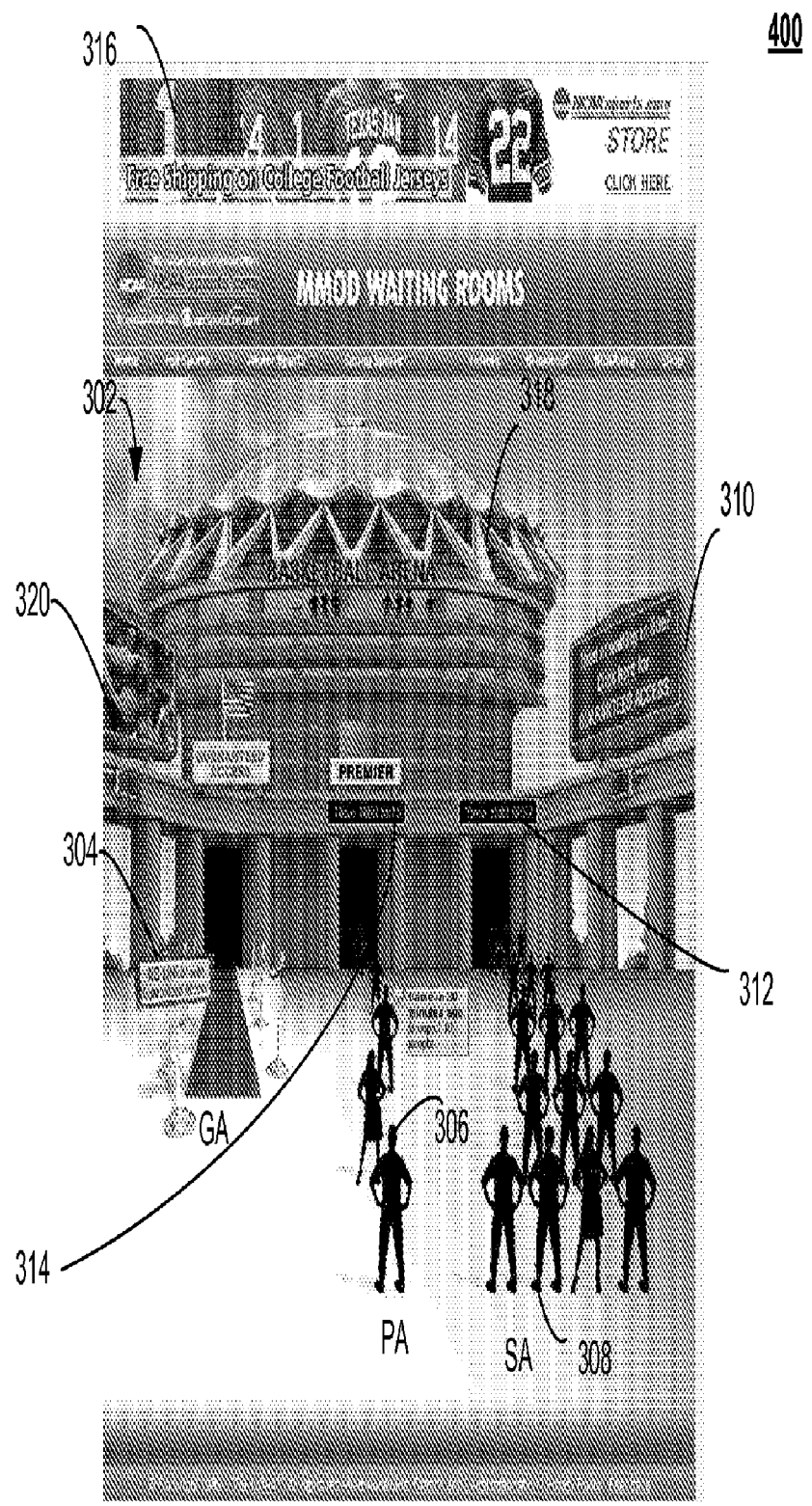
FIG. 4 depicts an exemplary embodiment of a screenshot of an exemplary waiting room graphical user interface (GUI), including a guaranteed access, premier access and standard access queues graphically depicted, as well as optional advertising, venue, and content data, according to an exemplary embodiment of the present invention.

In an exemplary embodiment, a venue model may illustrate a notion of limited capacity via, e.g., but not limited to, a graphical representation as illustrated in FIG. 1, and/or FIG. 4. An exemplary embodiment may include a graphical representation which may provide a juxtaposition of Premier and Standard Access lines, which in an exemplary embodiment may include:
  a manageable, fast-moving Premier Access (PA) line; and
  a large, growing Standard Access (SA) line.

Guaranteed Access "red carpet" and upsell messaging (may be included in one exemplary embodiment).

Customer's place in line may be displayed and may be regularly updated in an exemplary embodiment.

In an exemplary embodiment, the user may be warned, such as, e.g., "WARNING! Do not exit this page or you will lose your place in line."

Standby Queue Processing

Processing exemplary standby queues may mean that a concurrent, simultaneous stream count may be taken and compared against Z %. The % of available streams may be calculated and the queues may be allowed access to the event, in an exemplary embodiment, as follows:

1) PREMIER STANDBY (exemplary)
   Processed every X minutes (e.g., but not limited to, every minute),
   may be always processed before Standard queue, and
   if Premier Standby queue is fully serviced, may proceed to Standard queue processing.
2) STANDARD STANDBY
   may be only processed when games are underway,
   processing may be skipped if Premier Standby queue is still populated, and
   may be processed every Y minutes (e.g., but not limited to, every 3 minutes).

In an exemplary embodiment, a premier access class access tier may be a set % of Z %, such as, e.g., but not limited to, two times, three times, ten times z %, etc., based on estimated peak gigabytes per second and average stream rate.

required to register well in advance of an event, and may be required to provide some specific value exchange to the entity providing the event (such as, e.g., but not limited to, a broadcaster, a content provider and/or a content distributor). In an exemplary embodiment, the GA users may pay a fee to achieve GA status, or perhaps could agree to sign-up for marketing promotions, products, or the like, to become a member of this class of users.

In exchange for the explicit value they give the event-organizing entity, the GA user may be given reserved content distribution network (CDN) bandwidth—in other words, a reserved amount of total available CDN bandwidth, i.e., a specific portion, would always be reserved to accommodate the GA class of users. The amount of bandwidth needed for the GA class of users may be known ahead of the event based on pre-event registrations.

TABLE 2

Request & Capacity Scenarios

| | Capacity scenario | | |
|---|---|---|---|
| v = Request scenario | Stream request made with simultaneous streams less than Z % and "all is well" | Stream request made with simultaneous streams less than Z % but all is NOT WELL | Stream request with simultaneous streams at or above Z % |
| "Guaranteed Access" Ticket holder | Immediate access Unlimited viewing time max Max simul streams = 1 (keep it simple in year one and try to increase this number in future) Max stream = 1 Mb (to simplify, could be considered w/each other access tiers) | Will expect to get in so need message indicating "technical difficulties" Place in Premier Standby pending "all is well" situation | Immediate access Unlimited viewing time max Max simultaneous streams = 1 |
| "Premier Access" Ticket holder | 60-minute "still there?" check once games are underway . . . if no response after 300 seconds, kill Max simul streams = 1 (keep it simple in year one and try to increase this number in future) Max stream = 400k | Place in Premier Standby pending "all is well" situation | Premier Standby Once access to MMOD is granted, ALL IS WELL rules for this access tier apply |
| "Standard Access" Ticket holder | If pre-game, Standard Standby If games in progress: 30-minute "still there?" check once games are underway . . . if no response after 300 seconds, kill Max simul streams = 1 Max stream = 400k | Standard Standby pending "all is well" situation | Standard Standby Once access to MMOD is granted, ALL IS WELL rules for this access tier apply |

Exemplary Waiting Room Functionality

Two, three, four, and/or more access tiers of classes of users and/or standby queues may be used, in one exemplary embodiment, which may be suitable for use with an online video stream content event, such as, e.g., a sporting event such as, e.g., but not limited to, CBS March Madness. Exemplary access tier classes of users or video consumers may include, in an exemplary embodiment, 1) guaranteed access, 2) premiere access, and 3) standard access.

According to an exemplary embodiment, users placed in standby queues may be provided, e.g., but not limited to, advertising, alternate video, or other content while waiting, such as, e.g., scores, news, etc., communication tools, e.g., chat, email, instant messages, etc., or other entertainment such as, e.g., but not limited to, games, contests, trivia, facts, surveys, interactive information, etc.

Exemplary Guaranteed Access (GA)

In an exemplary embodiment, the guaranteed access (GA) users, according to an exemplary embodiment, may be There may not be a set limit on the size of the GA class of users, but generally, the GA class of users may be small in relative comparison to the other users (in an exemplary embodiment, the GA users may be significantly less than 10% of the total users).

The GA class of users may never be placed into the waiting room (according to an exemplary embodiment). According to another exemplary embodiment, the GA users may be briefly taken through the waiting room via a graphical representation of a red carpet, or the like to provide the GA user recognition of the status provided the GA user, relative to other classes of users.

Exemplary Premier Access (PA)

In an exemplary embodiment, the premier access (PA) class of users may also be required to register in advance of the event, according to an exemplary embodiment of the present invention. In an exemplary embodiment, the PA class may not be required to provide specific value for the PA class status (e.g., the PA users may not be required to pay a fee).

Although the PA users may not need to provide specific value for the PA class, the total size of the PA class of users may still be limited. For example, the PA class may be required to register early, or may be a targeted group, or a very important person (VIP) group of users, according to an exemplary embodiment. Scarcity may be used to encourage users to sign-up for the PA class, well ahead of the event ("only xxx premier seats are left, sign-up now", "get premier access while it lasts", etc.).

Users in the PA class may not be guaranteed CDN bandwidth. Instead, the value proposition (in non-consumer terms) may be that the PA user class may be given most of the CDN bandwidth not being used by the GA class of users, and if placed into a waiting room, PA users may be processed (admitted) at a much faster rate than Standard Access (SA) users, discussed below. An analogy to the PA class of users is a VIP line at a nightclub: sometimes if the club is really crowded you still stand in line even if you're a VIP, but you get in a lot more quickly from the VIP (or PA) line than the poor folks in the anonymous (or SA) line.

Exemplary Standard Access (SA)

In an exemplary embodiment, the standard access classification tier of users may be late registrants, or users who perhaps may not have acted quickly enough to become a PA member.

Basic registration is all that may be required for this class. There may be no limit to the size of this class of users.

Users in this class may not be guaranteed anything in an exemplary embodiment. If there is lots of CDN capacity available when an SA user attempts access to a stream, they may get access. However, when placed into the waiting room, SA users may be processed at a slower rate than PA users (for conversation purposes, let's say that for every 1 SA user who gets admitted to the player, 5 PA users may get admitted).

In another exemplary embodiment, once an SA or PA user is placed into the waiting room, the user may still buy their way out of the queue by upgrading to become a Guaranteed Access member, and may by paying whatever exchange is required, perhaps can get immediate access to the streams, in one exemplary embodiment. In an exemplary embodiment, the upgrade may need to take place via a registration & billing system, for example.

To emphasize the value of being a PA member, the waiting room may provide some readily apparent and easily understood visualization of how fast the PA "line" (queue) is moving as compared with how slowly the SA line is moving according to an exemplary embodiment. The goal may be to provide an incentive to SA users to, e.g., but not limited to: a) buy their way out of line by immediately upgrading to GA, or, b) desire to become a PA member for a next event, such as, e.g., but not limited to, a subsequent year's March Madness on Demand (MMOD), or the like.

Once users have entered the waiting room, in an exemplary embodiment, the user may keep that browser window open, in one embodiment, in order to not "lose their place in line".

Exemplary Controls

The waiting room may be controlled by service provider staff using, in an exemplary embodiment, e.g., but not limited to, up to 5, or more, controls (metaphorically referred to here as: knobs) (values used are for exemplary, and non-limiting purposes only).

The controls, in an exemplary embodiment, may allow the service provider staff to adjust the behavior of the waiting room by adjusting the knobs. For instance, in an exemplary embodiment, the "knobs" may be initially set as follows:

a Total content distribution network (CDN) capacity knob: 100 gbps

Guaranteed access reserved network resources knob: 15 gbps

Buffer (to allow for error) knob: 10 gbps

Remaining capacity (100-15-10) knobs: 75 gbps, which may in turn be allocated on a percentage basis via two exemplary knobs, in an exemplary embodiment:

| Allocated to PA | 80% |
| Allocated to SA | 20% |

So, in an exemplary embodiment, via the 5 knobs (inputs to the waiting room software), the behavior of the waiting room software, in an exemplary embodiment, may be adjusted to:

Control whether there is a waiting room at all (if no waiting room, then all users may be sent through to the online event player, in one exemplary embodiment), Ensure all GA users have CDN access, in one exemplary embodiment, Determine how much bandwidth may be allocated for PA & SA users, in another exemplary embodiment, Control how quickly PA users may be moved through the waiting room as compared with SA users.

Ideally the knobs may be adjusted in near-realtime (perhaps 1-2 minute increments) to control the behavior of the waiting room, in an exemplary embodiment.

Exemplary Authentication

The waiting room capability may provide enough security, in an exemplary embodiment, to ensure that:

Users who may not have registered cannot hack their way into the room.

Users may not hack their way from one class to another class within the room.

Users who are transferred from the waiting room to the player (browser URL changed to the player), may be required to have an authentication token passed to the player as part of that process (so that the player can authenticate that they are coming from the waiting room). The algorithm and rules for token creation may be determined jointly.

Exemplary Scaling

In an exemplary embodiment, the waiting room may need to handle up to a maximum of 100 k peak users.

Exemplary March Madness on Demand (MMOD) Waiting Room

An exemplary embodiment of an exemplary waiting room may include an online, multi-level tiered access waiting room and gatekeeper such as, e.g., but not limited to, a March Madness on Demand (MMOD) Waiting Room available from CBS SportsLine of Fort Lauderdale, Fla., USA.

In an exemplary embodiment, to provide streaming video for, e.g., but not limited to, a large audience online event such as, e.g., but not limited to, all NCAA Men's Basketball Tournament games, it is recognized that a seriously challenging problem existed using conventional solutions, i.e., there likely may be significantly more demand for network resources such as bandwidth, than may be served economically.

In an effort to avoid overloading a finite resource content distribution network (CDN) system with unbounded approaching infinite potential demand, which exceeds the finite resources of the system, conventionally resulting in undesirable response time/access performance for all users, an exemplary embodiment of the present invention instead implements an Online Waiting Room to manage the user demand for bandwidth network resources.

Exemplary User Levels

Users may be categorized into one of three exemplary tiered user classification levels, in an exemplary embodiment:

1. Guaranteed Access (GA). The GA users, in an exemplary embodiment, may receive access to any stream that the GA user may desire without having to wait. GA users may need to have acquired a specific product in order to have this access, in an exemplary embodiment. The GA user access tier may or may not require a user fee payment.

2. Preferred Access or Premier Access (PA). The PA users, in an exemplary embodiment, may be placed on the preferred or premier access queue in the waiting room. This queue may move significantly faster than the one for the next or later corner (LC)/standard access (SA) level users. The PA users in this level may have acquired a specific product ahead of time.

3. Later corners (LC) also referred to as Standard Access (SA) in an exemplary embodiment. The SA users, in an exemplary embodiment, may be everyone else.

The number of users in the GA category may be capped to 20% of total available bandwidth, in an exemplary embodiment. Similarly, the PA category may also be capped at 200% of capacity, in an exemplary embodiment, but one may expect that generally capacity may not reach this number.

Exemplary Splash/Signup

A key component, in an exemplary embodiment, of this strategy may be to have good advance messaging of users, to get the more hard core fans into the GA category, and to get the rest into the PA one. It is important, in an exemplary embodiment, to convey a sense of the high demand for the higher user access classes, i.e., that the system may support only a limited supply of GA and PA access tier users. The limited amount of GA and PA reserved slots may create a sense of urgency to encourage users to sign up for this product, to avoid being shut out, and may drive up signups. An exemplary embodiment of the present invention may include a viral component, which may insure those that signup may help their friends get better access, so as not to be shut out, either.

These early signups may not only reduce load on our servers for peak events, such as, e.g., but not limited to, March Madness, but also may help an online content access provider to manage the load by providing advance information as to the number of potential users for any upcoming events.

A high-risk/high-reward strategy may be to display a thermometer-like graphic on e.g., but not limited to, marketing pages showing how many of the GA subscriptions have been sold, for a given exemplary event. If the early demand is there, it can help kick start the process and help demand grow. If early demand does not materialize, people may be more likely to wait it out.

Figure 6:
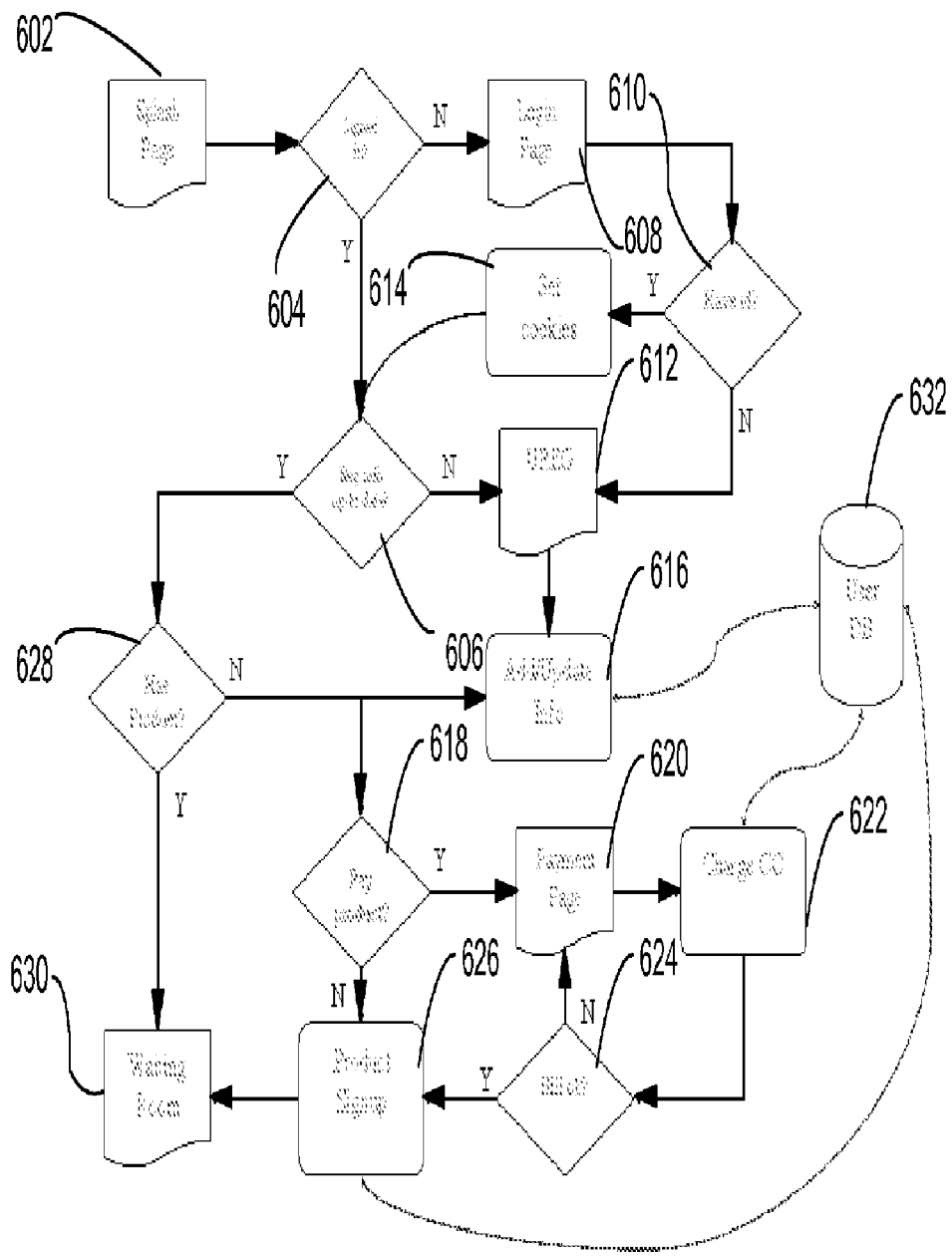
FIG. 6 depicts an exemplary flow of a user interaction experience according to an exemplary embodiment.

The process to signup users may be a standard process as may be used for fantasy products and other products as depicted in diagram 600, in an exemplary embodiment in FIG. 6.

In an exemplary embodiment, a user may attempt 602 to access the signup page. Upon determining if the user is signed in 604, if the user is not signed in, the user may be redirected to a log in page 608, or if already signed in, may be prompted 606 to find out whether the user's registration information is up-to-date, or if it needs to be updated. If registration information needs to be updated, or revised, flow diagram 600 may continue with a registration application 612. If registration is up-to-date, flow diagram 600 may continue with determining if the user has subscribed to a product 630. Upon logging in 608, it may be determined, in an exemplary embodiment, if the user has an account id 610. If the user has an id then the user may enter the username/password at login page 608, cookies may be set 614, and the flow diagram may check if there are any updates to the user's registration information at 606. If it is determined that the user does not have an id at 610 from login page 608, then the user may be redirected to a registration application 612 to signup. In an exemplary embodiment, if the user does not have an account id, the user may register at 612. The user registration application 612 may register the user, according to an exemplary embodiment. When registration is completed, the user may be sent to a page to add or update information 616, which may update the user's information in database 632. In an exemplary embodiment, in 628, if it is determined that the user has a product, or is subscribed, then the user may be sent to the waiting room 630. If in 628, the user is determined not to have a product, or subscription, then the user may be prompted whether the user would like a pay product, or nonpay product. If the user wants a pay product, flow diagram 600 may continue with payment page 620, which may charge the user's credit card 622, if the user desires, and the user's credit/financial/billing records in the database 632 may be accessed, and if the billing record looks ok, then the user may be signed up for the product and the flow diagram may continue with 626. If the billing information is not good, then the user may be sent back to the payment page 620, for a different credit card, or payment method. The signup page 618 may redirect the user to a payment page 620 for the product (if the access tier of a given product is a pay product). When payment is completed, the user may be sent back to the signup page 626. The signup page 626, in an exemplary embodiment may not need to ask any action from the user, so this page can be transparent, and may appear in one exemplary embodiment as a simple 'Thank You for signing up' message with further instructions on what the user should do. From signup page 626, flow diagram 600 may continue with placing the user in the waiting room 630.

In an exemplary embodiment, when an event such as, e.g., but not limited to, a game, is in progress, the signup page may redirect the user directly to the waiting room 630.

Figure 7:
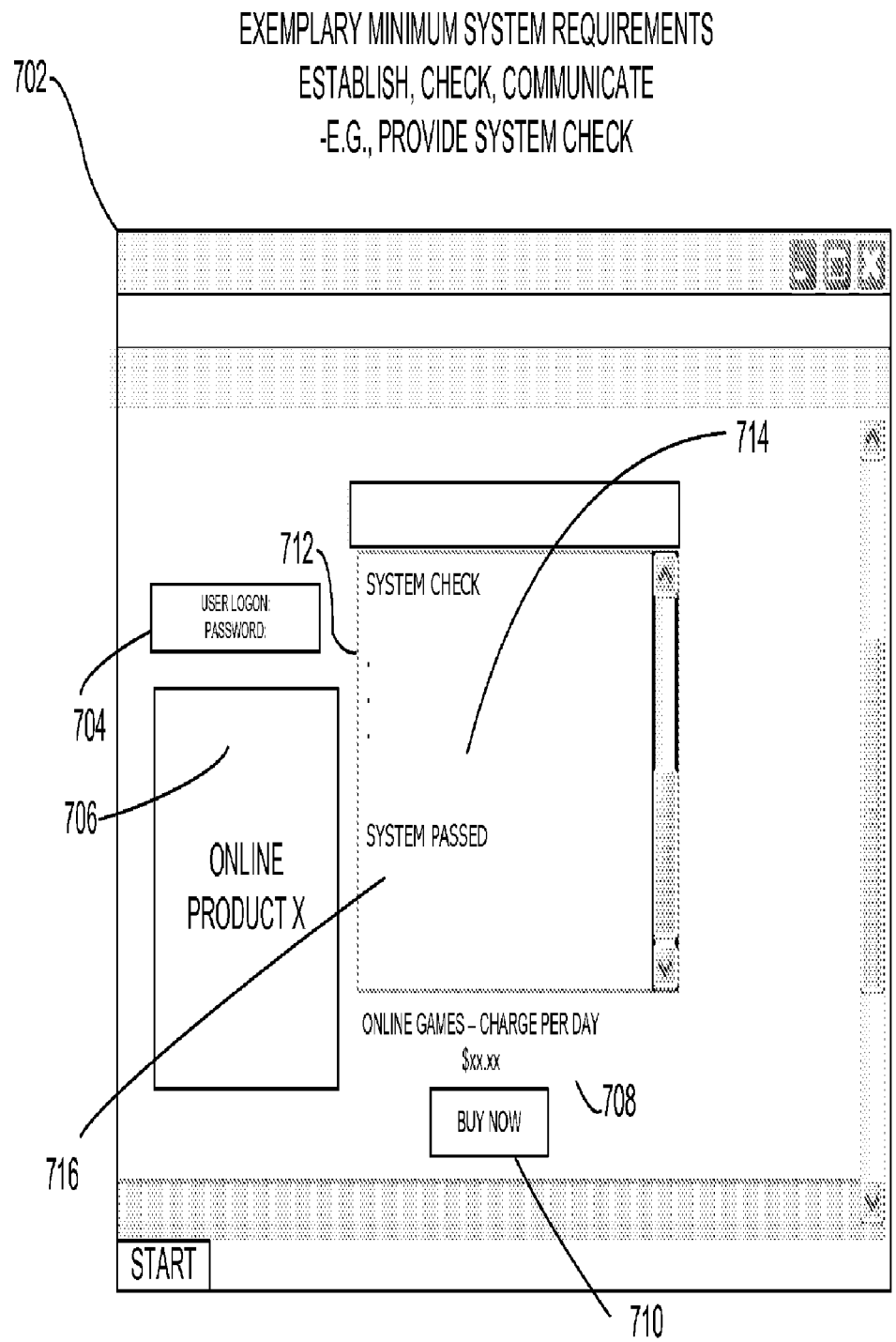
FIG. 7 depicts an exemplary embodiment of a user registration and minimum system requirements functionality check.

FIG. 7 depicts an exemplary screenshot 700 of an exemplary browser-based application 702 prompting a user to sign in 704, prompting the user to sign up for a product 706, providing pricing information 708, allowing the user to agree to purchase 710, and upon agreeing to purchase, running a system minimum system requirements check 716 to determine whether the user's system will support the requirements of the application, which may include determining if one or more tests are passed 714.

Exemplary Embodiment of a Waiting Room

In an exemplary embodiment, the waiting room may provide the following functionality:

1. may provide a place for users to wait until bandwidth is available;
2. may give the users information as to their place in the line, and how long before they may get access;
3. may give users in e.g., but not limited to, both, the PA and LC (and/or additional) queues a visual representation of how fast each queue is moving;
4. may give users the opportunity to move up to the GA level, if we have not reached the cap;
5. may communicate to the users the importance to keep the window up; if the users close the window or the user's browser "dies" or needs to be reopened, the users may lose their place in line;
6. the waiting room may be launched in a separate window, without a website's standard navigation, and browser buttons/address bar, in an exemplary embodiment; any links on the window may spawn a separate window, in an exemplary embodiment;

7. may display scores or other information of events such as, e.g., but not limited to, games, currently in progress;
8. may notify users when it becomes the user's turn to exit the waiting room and enter the event; and may display a link for the user to access a video player, in an exemplary embodiment;
9. the PA queue may move faster than the LC queue, in an exemplary embodiment; however, people from the LC queue may get in before the PA queue is completely exhausted, as long as no one gets in faster via the LC queue, in an exemplary embodiment;
10. GA users may be able to see their advantage by briefly seeing the waiting room page on their way into the product; this may make the users feel good about their status; and
11. may assign users to a specific communications distribution network (CDNs).

Exemplary Embodiment of a Video Player

According to an exemplary embodiment, the video player may provide the following exemplary functionality, including various other well known functionality, as well as the exemplary functions listed below. According to an exemplary embodiment, the video player may include support for the following:
1. may support switching games; once a user gets access to a stream, the user may have access to any game without having to go thru the waiting room again, in an exemplary embodiment; and/or
2. may support dropping users off if they are idle; if the video player goes longer than some timeout value without serving video, the user may be dropped from the video player, to help allow managing demand.

An Exemplary Embodiment of a Queuing System

An exemplary embodiment of the invention may include an exemplary queuing system. The following describes exemplary mechanics of the queuing system, in an exemplary embodiment, and how the queuing system may process requests for video streams. The queuing system, in an exemplary embodiment, may contain two processes: a doorman and a receptionist. The doorman, in an exemplary embodiment, may be the process that may let users into the video player, while the receptionist may be the process that may take the users information and may tell them where to wait for the user's turn.

Exemplary Constants which May be Used by the Queuing System of an Exemplary Embodiment An exemplary embodiment of the queuing system may include a number of exemplary constants, in an exemplary embodiment:
an interval when the doorman may let people in may be represented by a value f, which may be measured in seconds, in an exemplary embodiment. This interval, in an exemplary embodiment, may be, e.g., but not limited to, a minute, or so. The process that lets people in may need to wake up at this interval, analyze the situation and let some people in, allowing the system's load to be increased, gradually.
a ratio of the PA to LC queue speeds, in an exemplary embodiment, may be represented by r, a number of PA users to let in for each LC user, in an exemplary embodiment.
a number of content delivery networks (CDNs) may be represented by c. In an exemplary embodiment, there may be 1, 2, or more CDNs.
a frequency of update of CDNs may be represented by t, which may be the same for all CDNs, for simplicity, according to an exemplary embodiment. Note that f may be significantly less than t, in an exemplary embodiment.

Input Values of an Exemplary Embodiment of the Queuing System

An exemplary embodiment of the queuing system may include various variables which may include, in an exemplary embodiment:
an input value representing available streams for each CDN, which may be represented by a variable ac;
an input value representing an artificial bandwidth cap, which may be represented by a variable p; the artificial bandwidth cap may force queues to form earlier in the process, and may force users to go thru a short waiting room period; this value may be specified as a percentage of total bandwidth, according to an exemplary embodiment.

Process of an Exemplary Embodiment of the Queuing System

An exemplary embodiment of the queuing system may include a process including, but not limited to, the following, according to an exemplary embodiment:
1. A user, in an exemplary embodiment, may attempt to access a video stream; the receptionist may look at the user and may give the user a ticket. The ticket may have a code and a number, in an exemplary embodiment. The code may be, e.g., but not limited to:
   a. GA for users with the GA product, in an exemplary embodiment;
   b. PA for users with the PA product, in an exemplary embodiment; and
   c. LC for all other users, in an exemplary embodiment.
2. The ticket number, in an exemplary embodiment, may start at 1 and may go up one for each user that comes in.
3. The receptionist may send the GA users straight to the doorman, in an exemplary embodiment.
4. The receptionist may tell the rest to take a seat in the waiting room, in an exemplary embodiment.
5. The doorman may stand by waiting for one of two events to wake the doorman process, in an exemplary embodiment:
   a. When a GA user comes in, the doorman may validate the ticket and may let the user into the video player;
   b. When the user's timer tells the user that f seconds have passed, since the last time it let people in, it may get the latest input values ac and p;
   c. Then for each CDN c, in an exemplary embodiment:
      i. the process, in an exemplary embodiment, may figure out how many users to let into this CDN according to the formula: $x_c = p * a_c * f/t$
      ii. the process, in an exemplary embodiment, may divide this number into PA and LC users:

$$x1 = x_c * r/(r+1) \qquad 1.$$

$$x2 = x_c/(r+1) \qquad 2.$$

iii. the process may let the next x1 users from the PA queue in, in an exemplary embodiment;
      iv. the process may, for each of the next x2 users in the LC queue, in an exemplary embodiment, the process may compare the user's ticket number with the user at the front of the PA queue:
         1. if the LC user has been there longer, the process may let the LC user in, in an exemplary embodiment.
         2. Otherwise the process may let the user at the top of the PA queue in, in an exemplary embodiment;

d. may set a timer to wake the process again in f seconds, in an exemplary embodiment; and 6. The receptionist may update the waiting room to show the users that are there, and how many people are in front of the user, at time, in an exemplary embodiment.

Waiting Room User Interface of an Exemplary Embodiment

Figure 3:
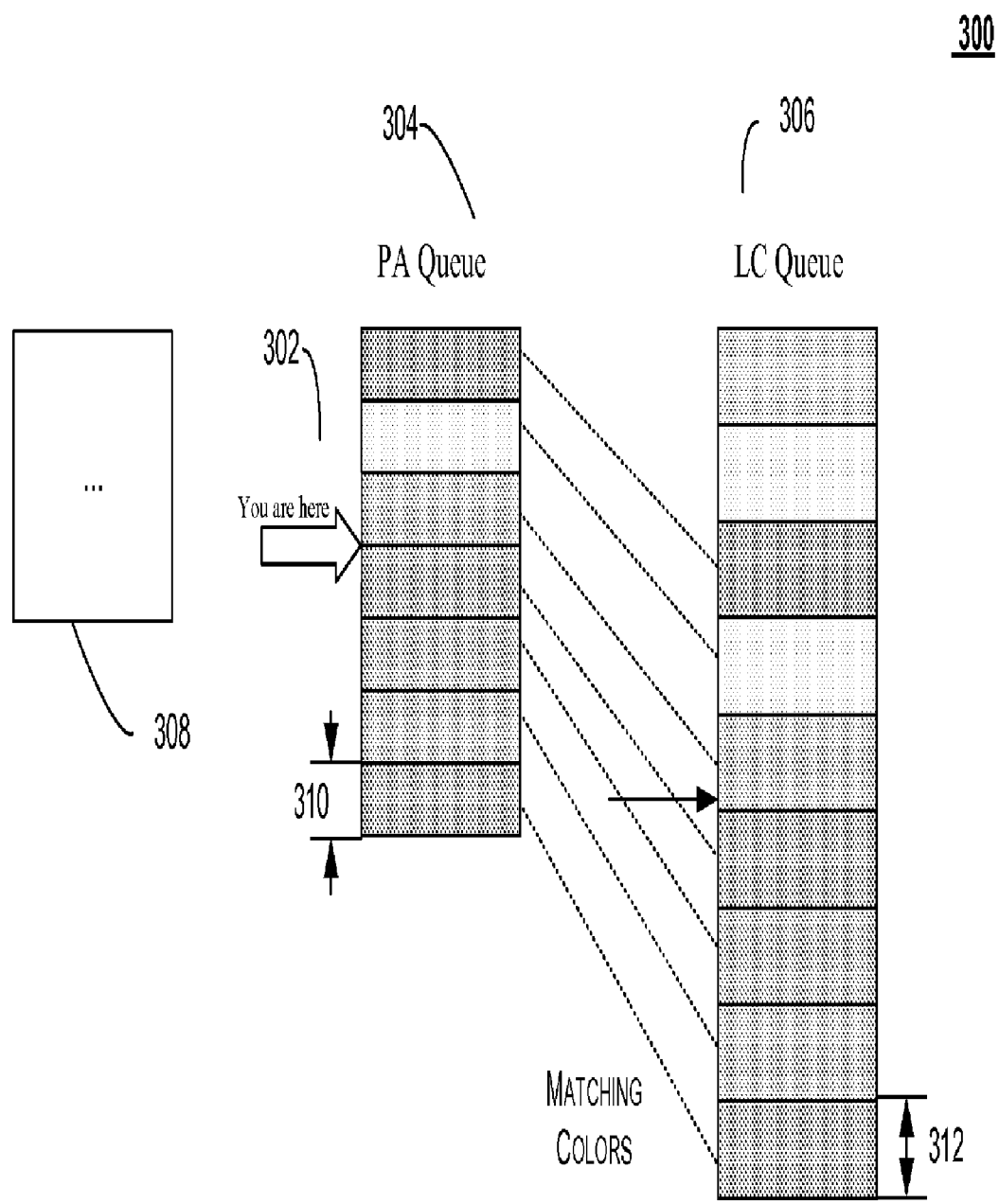
FIG. 3 depicts an exemplary embodiment of exemplary queues according to an exemplary embodiment.

The user interface for an exemplary embodiment of the waiting room may look something like FIG. 3.

In an exemplary embodiment, each tiered classification of users may be indicated including a guaranteed access (GA) (or any other) class 308, a premier access (PA) class 304, and a standard access (SA) 306 (shown as LC queue), according to an exemplary embodiment.

Shapes or colors may be used, in an exemplary embodiment, to represent users that got in line around the same time, in an exemplary embodiment. These users may be in the same bucket, or grouping, for this representation, in an exemplary embodiment, although that does not necessarily mean that all users in a bucket or grouping may gain access at the same time. The actual number of users in each bucket may depend on the size of the queue, in an exemplary embodiment. Potential queue sizes may be estimated in an exemplary embodiment. In one exemplary embodiment, a real-time scaling mechanism may be used, to adjust for actual figures, as compared to estimates.

Matching queues colors may be used (as shown), so it may be intuitive to the user that one queue may be moving faster than the other, based on two exemplary factors: the slower queue 306 may have larger buckets 310 relative to the faster queue 304 and the slower buckets 312 may move or be emptied slower. This speed may be apparent by having the color at the top of the fast queue likely matching the color somewhere in the middle of the slow queue, in an exemplary embodiment (as shown). Other queues such as, an exemplary guaranteed access, or other queue 308, may of course be provided. Further an indicator 302 may show where the user is presently in line, in an exemplary embodiment.

The exemplary graphical representation of FIG. 3 may be considered for illustration purposes only indicating basic relative queue functionality, according to an exemplary embodiment. However, for bandwidth reasons, the graphical representation may be generated client-side, in an exemplary embodiment. The waiting room may not add significant load or bandwidth to content provider or distributor systems, in an exemplary embodiment. In an exemplary embodiment, a server-generated graphic for each user may be created. In another exemplary embodiment, a client-generated graphic may be created for a user. In another exemplary embodiment, the waiting room front end code may be very lightweight (or small in storage size), just sending client data generated by the receptionist to the client, and the presentation may take place client-side. In another exemplary embodiment, avatars, or other symbols of a waiting viewer/user may be used to represent users.

Exemplary Embodiment of a Video Player Interface

When a doorman gateway application, according to an exemplary embodiment, decides that a user can get in, according to exemplary rules of access prioritization, it may change that user's waiting room to have a message telling the user that they can get in, and may display a link, or the like. The user may click on this link within a specified amount of time, according to an exemplary embodiment. If the user is away from the user's desk when they get the notice and misses the entry permission indication, the user may have to return to the back of the queue, according to an exemplary embodiment. In another exemplary embodiment, an alert may be generated, and a warning may be provided, with a countdown, which may be commenced to provide the user an opportunity to enter. In another exemplary embodiment, the user may be left near the top of the queue with a punishment, or extended delay counter, or the like, since the user was not ready when given access permission.

In one exemplary embodiment, the system may determine that a user is in fact a person and not a software agent, or proxy attempting to foil the queuing reservation system. Thus, according to an exemplary embodiment, a reverse turing test, turing test, or the like may be used to ensure that the user is in fact a human, and not a software agent, in an exemplary embodiment.

The link that may appear may have the page reload and validate the user one (or more) times (to avoid users capturing and sending the universal resource locator (URL) to their friends), according to an exemplary embodiment. Then the link may redirect the user to the video player application. The link may need to pass the following exemplary information, according to an exemplary embodiment:

1. The CDN to use, according to an exemplary embodiment;

2. The user's zip code, according to an exemplary embodiment;

3. International user indicator. International users may not be subject to blackouts, so the waiting room may need to indicate whether the user is a domestic user or international user, according to an exemplary embodiment;

4. A token, according to an exemplary embodiment, may be used to insure that the URL given to the player is not used more than once. According to an exemplary embodiment, the token may have some information encrypted into it, including a time stamp and an IP address, or lockout after first use, etc. The video player, according to an exemplary embodiment, may need to decrypt this token and if it the time stamp is within acceptable bounds and the IP address is the same, the user may have access to the video streams, according to an exemplary embodiment; and/or 5. Unique user ID, according to an exemplary embodiment, preferably an integer may be provided. According to an exemplary embodiment, Major League Baseball Advanced Media (MLBAM) may use Quova as a geo-targeting solution for blackouts. Quova may charge a fee per geo request. By passing MLBAM a unique user ID, MLBAM may call Quova only once per user (MLBAM may retain the info returned by quova for each user), thus saving costs. Quova may use the IP address as the primary determinant, backed-up by zip code if they can't resolve the IP location. A "hole" remains that a user may only get "quova'd" the first time they use the player. If they move to a different location/IP for subsequent accesses, the user may be geo restricted based on their first access. According to another exemplary embodiment, entry of a user location may be required, e.g., but not limited to, at least once, on multiple occasions, or each time one attempts to access, according to exemplary embodiments.

Exemplary Game Lobby or Waiting Room

According to another exemplary embodiment of the present invention, an online event may be a game. According to one exemplary embodiment, the event may be a March Madness on Demand (MMOD) sporting event, an NCAA basketball tournament. In another exemplary embodiment, the event may be an online massively multiplayer online (MMO) game. Regardless of what the event is, prior to the time the online event, such as a game commences, an exemplary lobby, or waiting room, may be created to provide the waiting players, viewers, contestants, gamers, and/or users, entertainment via content, prior to access of the online game or event. During this time, prior to commencement of the game, in an exemplary embodiment, users may be placed in the game lobby, or waiting room, where these users may, in an exemplary embodiment, be provided content such as, e.g., but not limited to, for registered users, see the usernames of other users in the game. As the number of users grows, listing names of all users may be difficult to impossible to display in a useful form. In an exemplary embodiment, information regarding the numbers of users, users participating, users invited by a given user, contestants invited by a contestant, and/or other information or other content, such as, e.g., but not limited to, information about the top N players in a game, information about invitees, etc., may be shown.

The functionality of a waiting room, lobby, or game waiting room, may include, according to an exemplary embodiment of the present invention:

The waiting room may validate, in an exemplary embodiment, a game password for users joining private games in the case of MMO games;

Users may be allowed, in an exemplary embodiment, to invite their friends to join the waiting room (via, e.g., an automatically generated message, a buddy list, etc.), via email, via on-site alerts and any other alerting platform, Internet chat, instant message, etc.;

Communication between users may be provided, in an exemplary embodiment, such as, e.g., but not limited to, chat with other users (e.g., in private games, within buddy lists in private games, in public games, e.g., amongst leaders, etc.); In one exemplary embodiment, pre-loaded chat and/or chat with trusted/untrusted lists may be allowed;

A countdown timer, in an exemplary embodiment, may indicate, or estimate, how long before entry to the game or event, or until the game or event may start;

An opportunity to move to a higher tiered class of standby line may be provided in an exemplary embodiment; and/or Right before the game, or event may be about to start, the lobby window may turn itself into a game or event window, according to one exemplary embodiment. In an exemplary embodiment, the same client that is used for the game may handle the lobby or waiting room, as well, so software loading problems may happen before the user gets to the lobby, but may not likely exist when the game or event is starting.

According to another exemplary embodiment of the present invention, a user may invite other users to join the waiting room. In one exemplary embodiment, the inviting user's credentials may be used in some way to increase the class of another invitee user. A list of invitees, according to one exemplary embodiment, from each user may be displayed on the lobby or waiting room page. When any invitee that a customer has invited to the game arrives in that game's lobby, that invitee may be highlighted as "arrived" on the inviter's lobby list, according to one exemplary embodiment. If an invitee has been invited to the game by more than one customer, the invitee may be shown in the lobby of each inviter, according to another exemplary embodiment of the present invention.

According to another exemplary embodiment of the present invention, users that may try to join a game already in progress, may be allowed to access the game as observers only. An observer, according to one exemplary embodiment, may have certain different features as compared to other viewers. A user may be registered and may be logged in to join or create a game.

Communication According to an Exemplary Embodiment

According to an exemplary embodiment of the present invention, participants in a waiting room may be permitted to communicate with other users waiting in line. In one exemplary embodiment, users may only communicate with other users in the same line as the user is in. In another exemplary embodiment, users may communicate with any users in any line. In another exemplary embodiment, users from a given line may communicate in a different way, or with different levels of features or fidelity, with users in a different line, than when users communicate with others in the same line as the user.

According to one exemplary embodiment of the present invention, communication between the users may be secure.

Capacity and Scalability According to an Exemplary Embodiment

The online waiting room application may allow for an infinitely scalable architecture, while providing a guaranteed level of bandwidth capacity for users granted access by the bouncer application. For example, capacity may be reserved for guaranteed access users, then out of remaining, non-reserved capacity, users from a next lower class of service may be provided access with a slower, but more quickly moving line than the lowest class of users. The lowest class of users, or general admission line, may include the larger majority of users who may only be provided access, as excess capacity is available beyond the capacity at any of the higher class levels of user access. Advantageously, by controlling access to the limited bandwidth, users experiencing the event may find better performance, and capacity may be tailored to an anticipated audience size without performance degradation from excess participants, as was conventionally experienced, particularly for large national online events.

Availability/Reliability According to an Exemplary Embodiment

According to one exemplary embodiment of the present invention, the system may include availability/reliability features. As contestants become passionate about getting into a higher class of service, they also become passionate about gaining the benefits to be provided at the higher class levels of entry and service. If there are technical problems customers may be lost, and thus uptime/availability/reliability and uniformity of enforcement of rules by the bouncer application may be crucial to success of an online waiting room, according to an exemplary embodiment.

Exemplary Embodiment of Computer Environment

Figure 5:
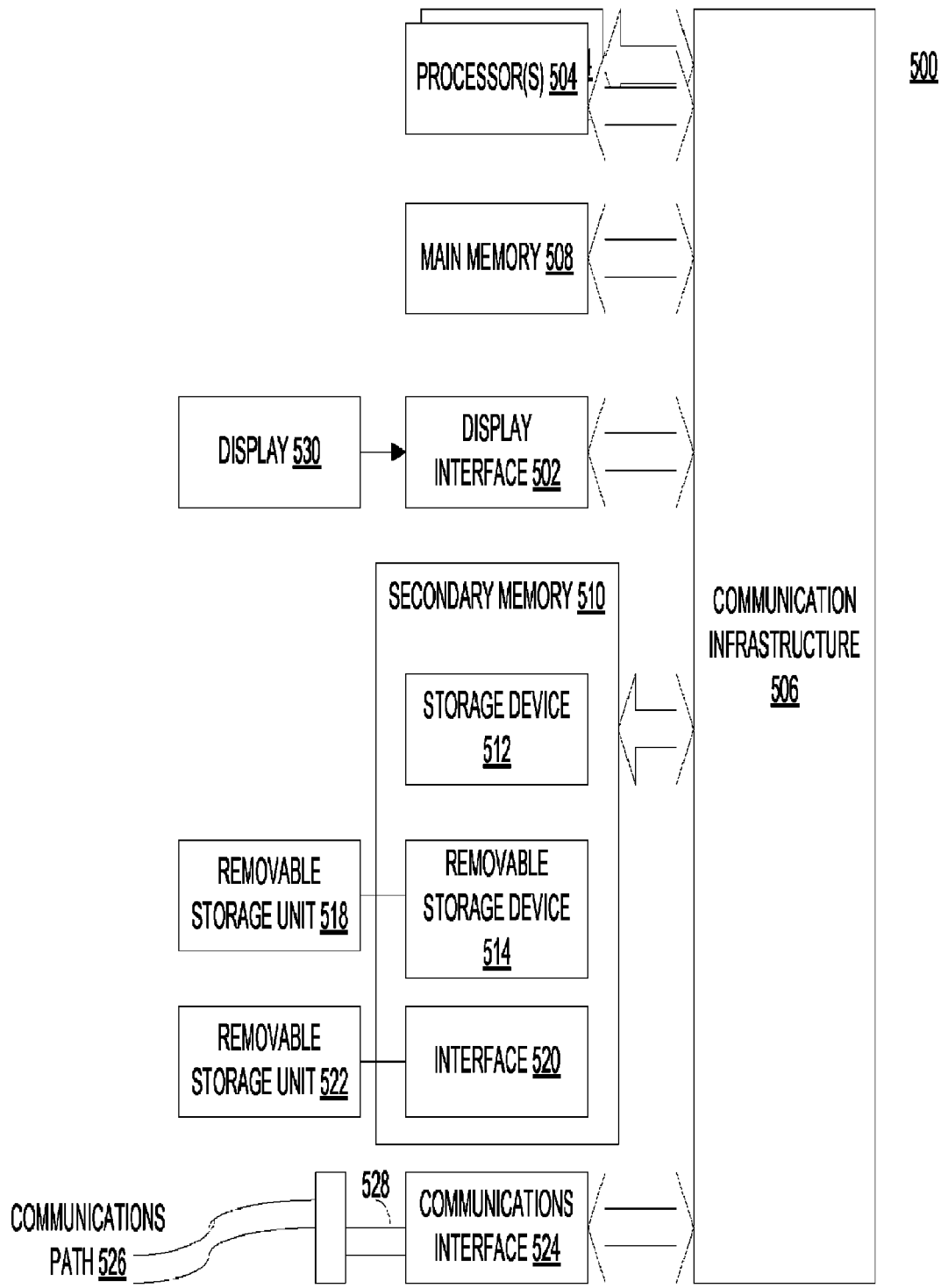
FIG. 5 depicts an exemplary embodiment of a computer system as may be used in implementing an exemplary embodiment of the present invention.

FIG. 5 depicts an exemplary computer system that may be used in implementing an exemplary embodiment of the present invention. Specifically, FIG. 5 depicts an exemplary embodiment of a computer system 500 that may be used in computing devices such as, e.g., but not limited to, client or server, etc. according to an exemplary embodiment of the present invention. FIG. 5 depicts an exemplary embodiment of a computer system that may be used as client device 500, or a server device 500, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC)

system running an operating system such as, e.g., (but not limited to) MICROSOFT® WINDOWS® NT/98/2000/XP/CE/ME/etc. available from MICROSOFT® Corporation of Redmond, Wash., U.S.A. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 is shown in FIG. 5. Other components of the invention, such as, e.g., (but not limited to) a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 5. Services may be provided on demand using, e.g., but not limited to, an interactive television (iTV), a video on demand system (VOD), and via a digital video recorder (DVR), or other on demand viewing system.

The computer system 500 may include one or more processors, such as, e.g., but not limited to, processor(s) 504. The processor(s) 504 may be connected to a communication infrastructure 506 (e.g., but not limited to, a communications bus, cross-over bar, or network, etc.). Various exemplary software embodiments may be described in terms of this exemplary computer system. After reading this description, it may become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive 514, representing a floppy diskette drive, a magnetic tape drive, an optical disk drive, a compact disk drive CD-ROM, etc. The removable storage drive 514 may, e.g., but not limited to, read from and/or write to a removable storage unit 518 in a well known manner. Removable storage unit 518, also called a program storage device or a computer program product, may represent, e.g., but not limited to, a floppy disk, magnetic tape, optical disk, compact disk, etc. which may be read from and written to by removable storage drive 514. As may be appreciated, the removable storage unit 518 may include a computer usable storage medium having stored therein computer software and/or data.

In alternative exemplary embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 522 and interfaces 520, which may allow software and data to be transferred from the removable storage unit 522 to computer system 500.

Computer 500 may also include an input device such as, e.g., (but not limited to) a mouse or other pointing device such as a digitizer, and a keyboard or other data entry device (none of which are labeled).

Computer 500 may also include output devices, such as, e.g., (but not limited to) display 530, and display interface 502. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices.

In this document, the terms "computer program medium" and "computer readable medium" may be used to generally refer to media such as, e.g., but not limited to removable storage drive 514, a hard disk installed in hard disk drive 512, and signals 528, etc. These computer program products may provide software to computer system 500. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

In yet another exemplary embodiment, the invention may be implemented using a combination of any of, e.g., but not limited to, hardware, firmware and software, etc.

Interactive Television Exemplary Embodiment

Figure 8:
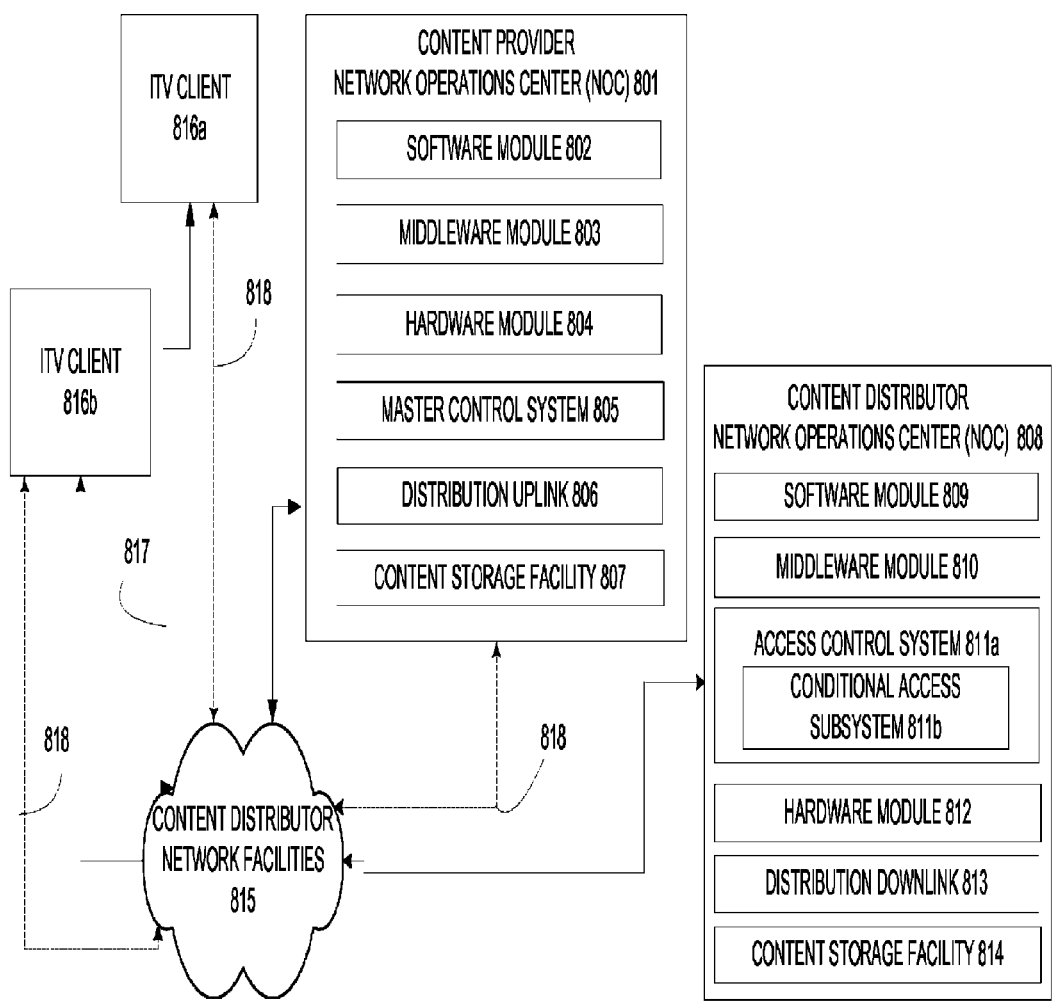
FIG. 8 depicts an exemplary embodiment of the invention where a viewer may be accessing content via an interactive television (ITV) environment.

FIG. 8 depicts an exemplary embodiment of the invention where a viewer may be accessing content, which may include an online waiting room according to an exemplary embodiment, via an interactive television (ITV) environment 800. The contestant's exemplary iTV environment is described below, according to an exemplary embodiment of the present invention. Although described below in a particular environment, the viewer's device may be implemented in a variety of other environments.

ITV environment 800 in an exemplary embodiment may include a content provider network operation center (NOC) 801, a plurality of ITV clients 816a, 816b, and a content distributor NOC 808. The content provider NOC 801, ITV clients 816a-b, and content distributor NOC may be coupled to one another by content distributor network facilities 815. The ITV environment 800 of FIG. 8 also illustrates, in an exemplary embodiment, a distribution channel 817 that may be used to broadcast content to the ITV clients 816a, 816b from the content providers over the content distribution network 115, and a backchannel 818 that may be used to receive interactive responses from the ITV clients 816a, 816b at, e.g., the content provider. The back channel 818 may be in an inband, or out of band channel. The back channel 818 may be separate from the distribution channel 816. The back channel 818 may use circuit connections, or packet switched communication.

Content provider NOC 801 may include, e.g., a software module 802 and a middleware module 803 running on top of a hardware module 804. The hardware module 804 may include, e.g., a processor and associated memory. The content provider NOC 801 may also include a master control system 805 that may be used to assemble portions of programming service content for distribution. The portions of programming service content may be accessed using various known methods from a content storage facility 807, onto which the content may have been previously stored. The content provider NOC 801 may also include a distribution uplink 106 that may be used to upload content to the content distributor for distribution to ITV clients 816a, 816b. Of course, the content provider in another exemplary embodiment, may communicate directly with ITV clients 816a, 816b. For example, the clients 816a, 816b may communicate via a communications link directly to the content provider via a protocol such as, e.g., but not limited to, simple mail transport protocol (SMTP), hyper text markup protocol (HTTP), etc.

Content distributor NOC 808 can include a software module 809, a middleware module 810, and an access control system 811a including, e.g., a conditional access subsystem 811b, running on a hardware module 812. A distribution downlink 813 can be used, in an exemplary embodiment, to download content from the content providers to the content distributor NOC 808, for temporary storage in content storage facility 814, prior to distribution directly to, or via the content distributor network 815, to ITV clients 816a, 816b for viewing by viewers.

Figure 9:
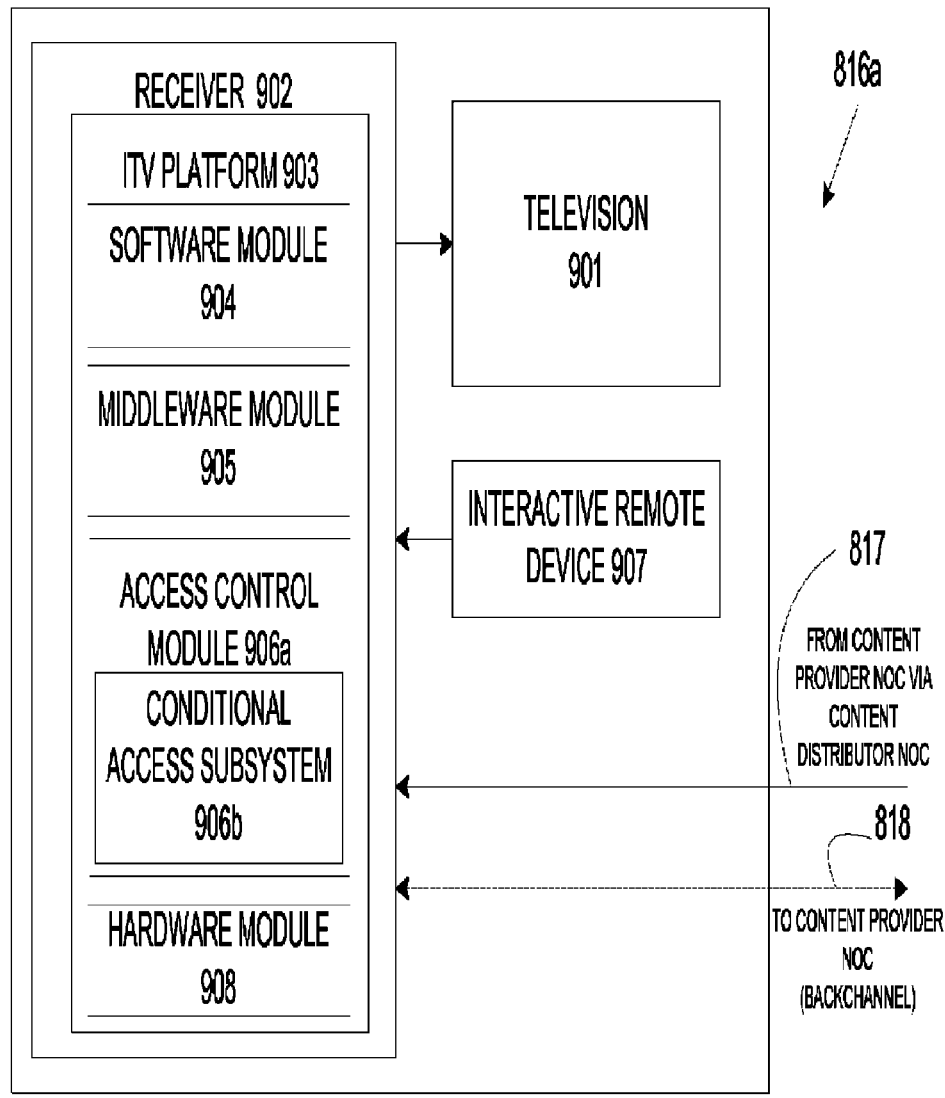
FIG. 9 depicts an exemplary embodiment of a receiver configured to receive content from a content provider via a content distributor which may include, e.g., a cable television (CATV) network.

As shown in FIG. 9, ITV client 816a may include, in an exemplary embodiment, a television 901, a receiver 902, and an interactive remote device 907 such as a remote control and content, which may include an online waiting room according to an exemplary embodiment. Receiver 902 can include, in an exemplary embodiment, ITV platform 903 that can include, e.g., a software module 904, a middleware module 905, an access control module 906a including, e.g., a conditional access subsystem 906b (such as a smart card), and hardware module 908. The hardware module 908 may include a processor and associated memory. The various modules may be combined into a set-top box. The set-top box may be configured to record programming services. As shown in FIG. 9, receiver 902 can be configured to receive content, which may include an online waiting room according to an exemplary embodiment, from content provider NOC 801 via, e.g., a content distributor network 815 and content distributor NOC 808, or directly via interface equipment, for example. The ITV platform 903 of FIG. 9 can be thought of as an example environment that could be used for a content distributor that uses a cable television (CATV) network. Content may be distributed to ITV 816a, 816b from the content provider over content distributor facilities as shown in line 817. Dotted line 818 represents an exemplary back channel 818 for sending interactive information to the content provider. The back channel is typically provided via a phone modem or via access to broadband.

Figure 10:
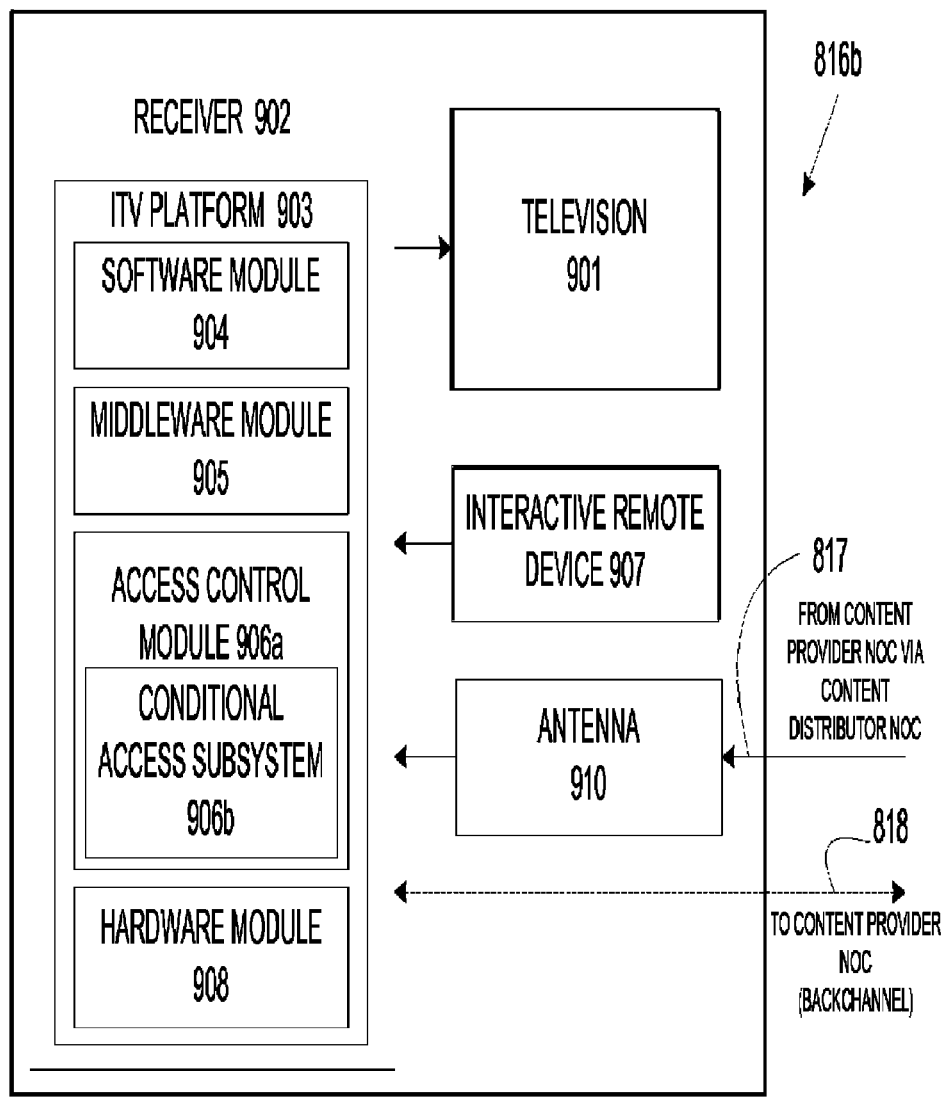
FIG. 10 depicts an exemplary embodiment of a receiver configured to receive content from a content provider via a content distributor which may include an antenna, such as, e.g., a satellite dish.

Alternatively, as is shown in environment 1000 in FIG. 10, receiver 902 can be configured to receive content, which may include an online waiting room according to an exemplary embodiment, from content provider NOC 801 via content distributor network 815 and content distributor NOC 808 via antenna 910, such as a satellite dish or the like.

The interactive television system described herein is exemplary only. The invention can also be implemented in many other types of interactive systems. For example, the content provider may communicate directly with the ITV clients 816a. Programming services, video and interactive television content, which may include an online waiting room according to an exemplary embodiment, may be provided directly to the viewer. Also, a back channel may be provided directly from the ITV client 816a to the content provider, without passing through a content distributor. A back channel is not necessary in all exemplary embodiments of the invention.

As will be understood by a person having ordinary skill in the art, content provider NOC 801 can distribute content via distribution uplink 806 to content distributor NOC 808. Content distributor NOC 808 can receive the content, which may include an online waiting room according to an exemplary embodiment, from content provider NOC 801 via distribution downlink 813. Content distributor NOC 808 can then distribute content to ITV clients 816a, 816b through content distributor network facilities 115. Examples of content distributors include, e.g., COMCAST CORPORATION of Philadelphia, Pa., USA, DIRECTV of El Segundo, Calif. USA, ECHOSTAR COMMUNICATIONS CORPORATION of Englewood, Colo., USA, and TIME WARNER CABLE of Stamford, Conn. USA.

The content provided to the ITV clients 816A may include a number of channels, such as broadcast network channels, cable channels, subscription channels, etc. These types of channels may be referred to as linear channels. Other types of programming services may also be provided, such as, e.g., on demand services. Exemplary forms of on demand services include, e.g., but are not limited to, a video on demand (VOD) service, a subscription VOD (SVOD) service, etc. Other on demand services may include any of various digital video recorder (DVR) offerings by which a viewer can record and view digital video content. An exemplary programming service program may include, e.g., a movie, or a series, that may be made available by a programming service such as, e.g., CBS, broadcasting programming services, or pay programming services such as, e.g., but not limited to, SHOWTIME. Programs may also include, e.g., high definition (HD) programs, VOD and SVOD programs, and programs stored on DVRs. Viewers that have advanced set top boxes may be able to access robust digital video recording and playback capabilities.

As will be apparent to those skilled in the art, access by users such as, e.g., but not limited to, participants, and contestants, may occur via devices, devices such as, e.g., but not limited to, communications devices, computing devices, telephony, mobile phone, PDA, handheld, laptop, notebook, iTV, location based systems, GPS, and content may be distributed over various network platform types including, e.g., but not limited to, voice, data, satellite, radio, digital broadband, ultra wideband (UWB), cable television (CATV), wired communications networks, wireless communications networks, direct broadcast satellite television, multichannel multipoint distribution service (MMDS), wireless fidelity (WI-FI), IEEE 802.11 WLAN networks, wireless wide area networks, IEEE 802.16 WWAN networks, (WI-MAX), broadband over power line (BOPL), mobile communications voice and/or data communications networks, cellular networks, analog and/or digital cellular networks, mobile networks, packet switched networks, voice over Internet Protocol (VoIP) networks, 2G, 3G, 4G, nG networks, using various access methods including, e.g., but not limited to, FDMA, CDMA, GSM, GPRS, etc. networks and protocols.

Exemplary Viewer Reputation Profile

According to one exemplary embodiment of the present invention, each viewer may have a profile and reputation engine may access the users' profiles. According to an exemplary embodiment, an online message board may use the reputation engine and user profiles in providing customized access/experience for users dependent upon reputation levels, factors, etc. According to an exemplary embodiment, a message board such as, e.g., but not limited to, CBS SportsLine Message Boards, available from CBS SportsLine of Fort Lauderdale, Fla. U.S.A. may be provided, a forum where a sporting event fan may come first. See Table 3, below, setting forth an exemplary table of exemplary components for an exemplary reputation system according to an exemplary embodiment.

TABLE 3

Reputation System encourages behaviors desirable to CBS SportsLine
CBS SportsLine Reputation System Components Connections: The Connections rating represents a Member's drawing power and sphere of influence. To arrive at the Member's Overall Rating, we total the following categories in descending order of impact:
The number of new members who have joined as a result of contributions to the CBS SportsLine community
The number of members who have saved a person's profile as a Favorite. Being added as a Favorite Member by a member with a high Overall Reputation Rating provides greater impact to the Connections score than being added by a member with a lower Reputation Rating
Value: Value represents the sum of the ratings that other members have given contributions. Similar to Connections, Value is influenced by the rater's Reputation. The higher the rater's Reputation, the bigger the impact to the Value Rating TABLE 3-continued Reputation System encourages behaviors desirable to CBS SportsLine
CBS SportsLine Reputation System Components Participation: The Participation Rating is assigned based upon the number and frequency of a participants contributions. The more active the member is across the environment of content, games, fantasy and contests, the higher the member's rating. Additionally, there is a factor for quality of contribution in order to gain the maximum effect
Skills: Skills Rating represents how well the member performs in games of knowledge and skills. These games include Fantasy games as well as Trivia Tower and CBS Games ratings Various other exemplary environments may benefit from a user profile/reputation engine system. Various exemplary environments may include, online sporting websites; online news websites; online content websites; online websites; gaming environments; fantasy leagues; message boards; trivia environments; live sporting events; live events; multiuser online gaming environments; etc.

According to an exemplary embodiment, the system may allow the best contributions and the most valuable contributors to stand front and center. Users decide by establishing the reputation of other users.

According to an exemplary embodiment, every post can be voted on. According to an exemplary embodiment, popular threads and thoughtful contributions may get the greatest exposure.

According to an exemplary embodiment, if a user is the person that creates a debate, then that user's stature in the community may rise. The higher a user's reputation goes, the more visible the user may become and the more freedom of expression the user may receive.

According to an exemplary embodiment, eventually, community leaders may emerge. According to an exemplary embodiment, users who have great things to say and who deserve a forum with integrity in which to speak, may get the forum.

According to an exemplary embodiment, Applicants understand that there are sports experts everywhere. Applicants know that opinions are like tongues—pretty much everybody has one—but on a reputation based forum, it is believed that fan-experts are far from ordinary, and the users may deserve a forum to conduct the debates of the day.

According to an exemplary embodiment of the invention, a feature may be to enable thoughtful contributions without the usual clutter of flame wars, useless noise and chronic misbehavior found on conventional message boards. According to an exemplary embodiment, the invention may encourage passion and discourage slander, so a system, according to an exemplary embodiment, may reward valuable contributions and good citizenship and may marginalize malicious talk and rude behavior.

According to an exemplary embodiment, it is the users who may decide what is good and what is not. Users may decide, e.g., but not limited to, by what users read, by who users read, by how often users read, and by how highly users rate what is read, according to an exemplary embodiment. According to an exemplary embodiment, users' interaction in the community defines the community.

According to an exemplary embodiment, the Profile Reputation System, may include, in an exemplary embodiment, a profile, an exemplary five levels, an exemplary four factors, and warning rules In order to become an active member of an exemplary CBS SportsLine online community, according to an exemplary embodiment of the present invention, the user must be a registered member and create a Screen Name.

According to an exemplary embodiment, the user's Screen Name cannot contain any indication that it is associated with the website such as, e.g., but not limited to, "CBS," "SPLN," "SportsLine" or any combination of these. According to an exemplary embodiment, a user may continue to use the user's CBS Member ID to sign into CBS SportsLine.com. According to an exemplary embodiment, the user cannot sign in with the Screen Name. According to another exemplary embodiment, a member ID and Screen Name may be the same thing.

According to an exemplary embodiment, a user may be prompted to join when the user may attempt to do any of the following, exemplary, but non-limiting actions: replying to a post; adding a member to favorites; rating a post; and/or warning another member.

According to an exemplary embodiment, a user may be routed back to the user's place of origin after creating the user's Screen Name.

According to an exemplary embodiment, after creating the user's Screen Name the user may receive a CBS SportsLine Profile. According to an exemplary embodiment, the user's CBS SportsLine Profile may be the hub of the user's online activity and the place to find all of the user's personal contributions and settings.

According to an exemplary embodiment, a user may use the "My Profile" link, which may be conveniently located at the top of every CBS SportsLine page, or the "Profile" tab when in the message board arena, to access the user's Profile and may keep the user's important private information up-to-date.

According to an exemplary embodiment, to edit the user's personal information, the user may go to the user's Profile page and may click on "Edit Info" at the bottom of the personal Info box. According to an exemplary embodiment, from here the user may be able to set public view display settings such as, e.g., but not limited to, show, or hide your Real Name, gender, Email Address and/or Motto.

According to an exemplary embodiment, selecting the My Settings and/or My Account tabs may allow the user to be brought to the user's personal information, whether the user may click from the user's Profile page or from someone else's.

According to an exemplary embodiment, the My Settings and/or My Account tools, along with the ability to delete members from the user's favorite list, may be available only to the specific user, giving the specific user control of the user's CBS SportsLine experience.

Figure 16A:
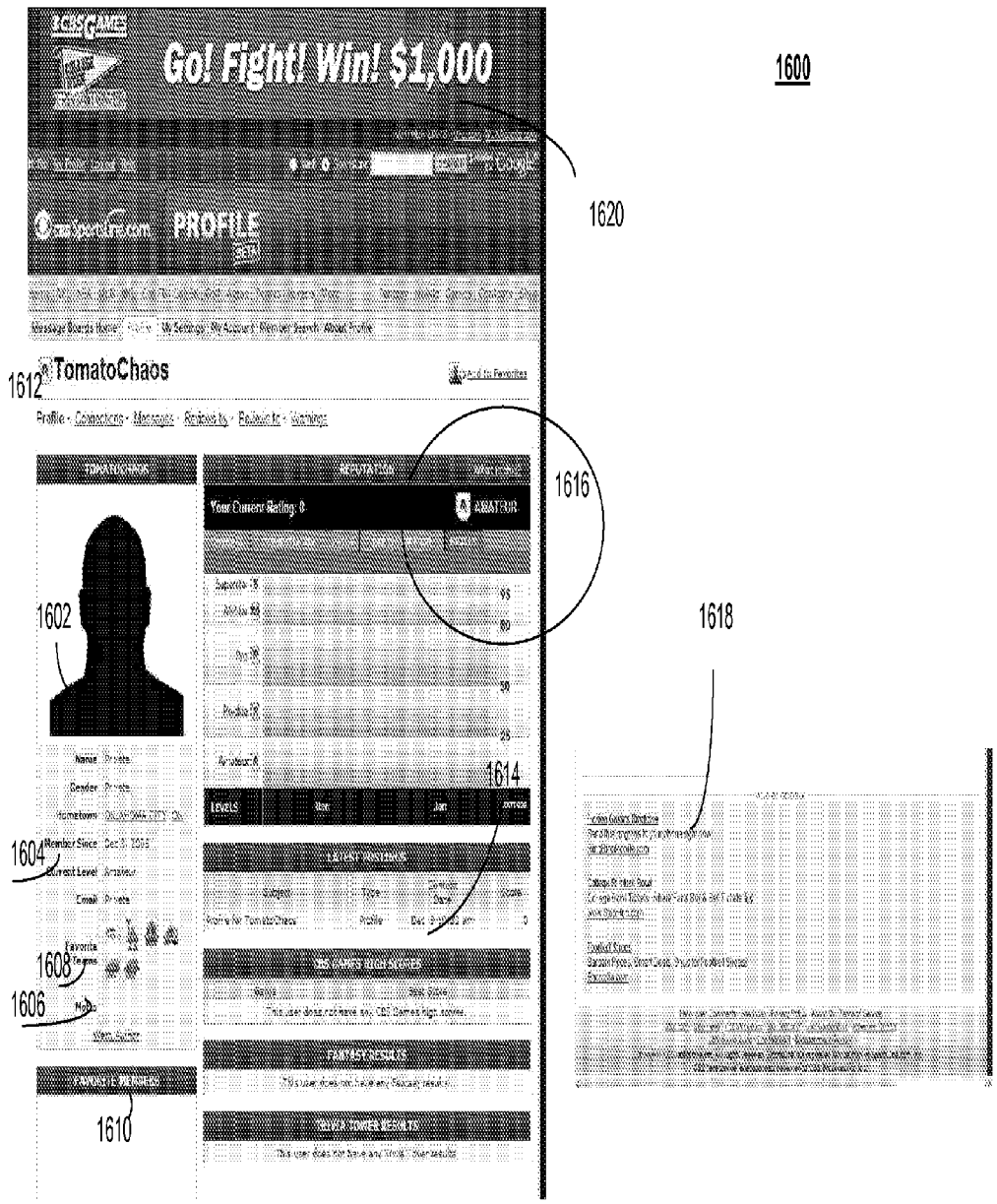
Figure 16B:
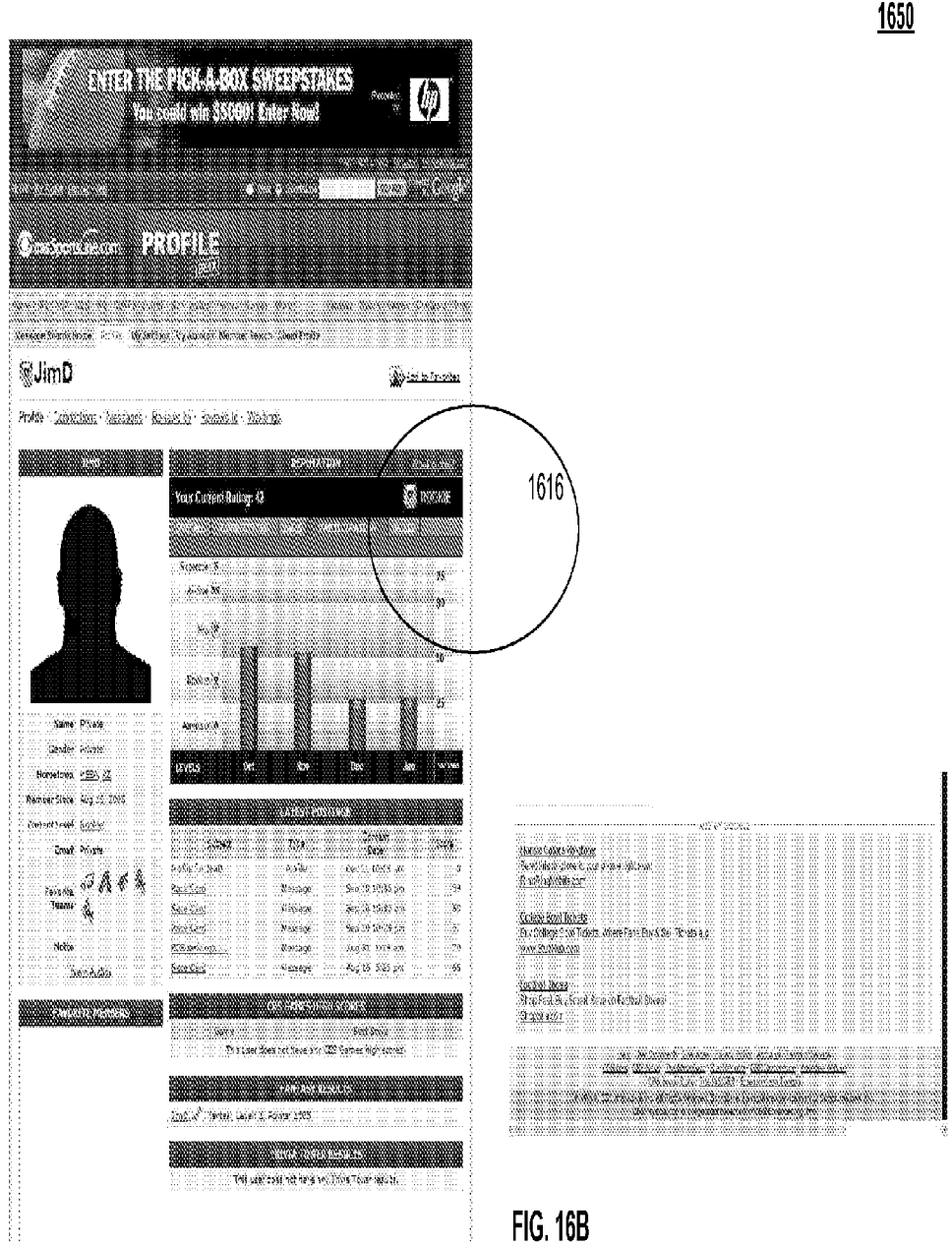

According to an exemplary embodiment, the Profile as illustrated in exemplary webpages 1600, 1650, and 1660 of FIGS. 16A-C, respectively, according to an exemplary embodiment, may track and display the user's contributions to the CBS SportsLine community. The profile may, e.g., but not limited to, display the user's standing in the community and may include the user's contributions with items such as, e.g., but not limited to: the user's Avatar (the user may select an Avatar from a gallery or, once the user has grown in the community, create the user's own customized avatar) 1602; Member Since date (may track the user's induction into the SportsLine community) 1604; Your Motto (may provide a place for a user to share a few "words of wisdom", if the user wishes to add some) 1606; Favorites (the user's top teams as may be selected from the Settings page) 1608; Favorite Members (a list of these for the user and links to other SportsLine members in your circle of friends may be provided) 1610; Your Reputation Level (the user's current Reputation Rating and Level with SportsLine may be provided) 1612; and/or Latest Content (the user's most recent postings may be provided) 1614; etc.

Figure 19A:
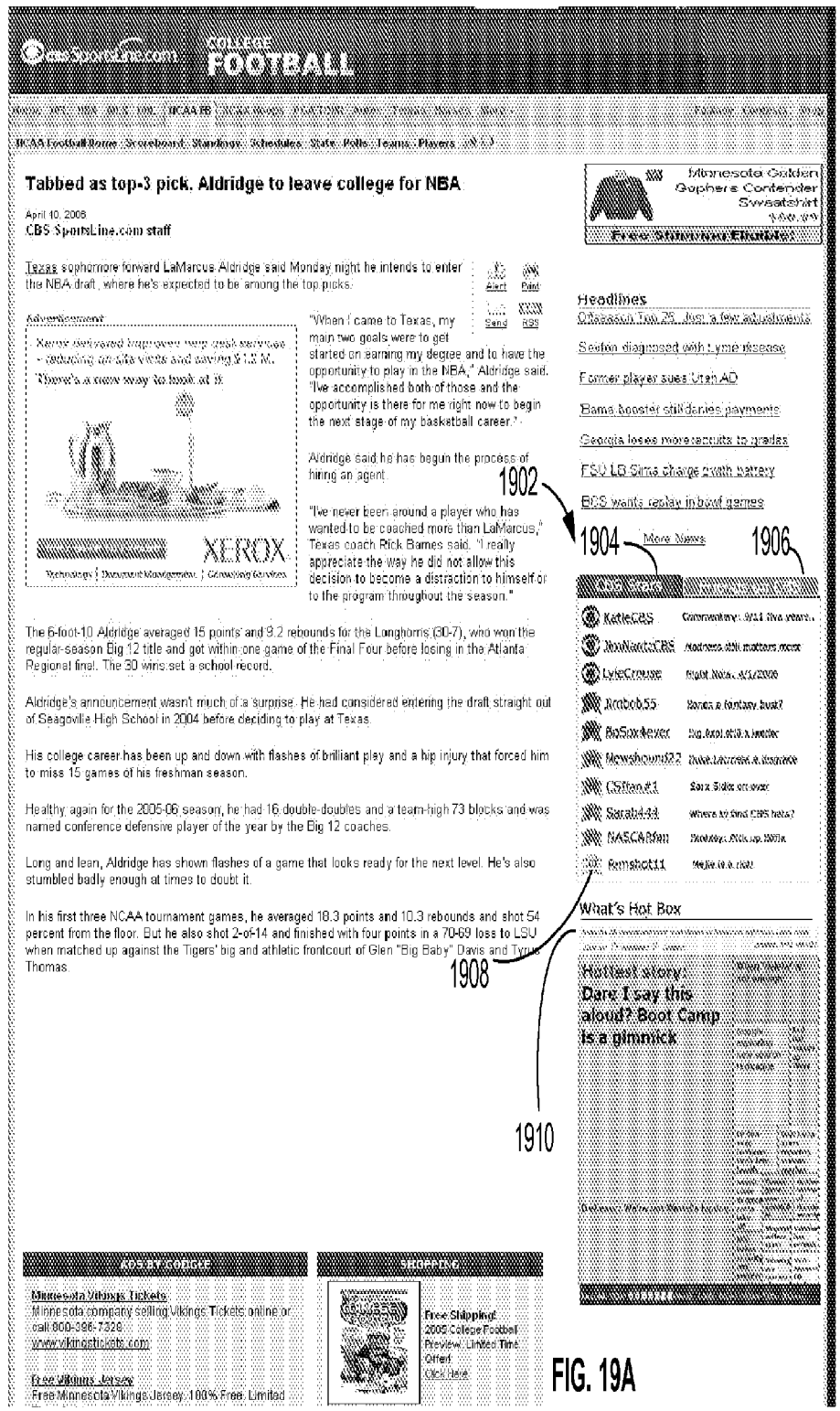
FIG. 19A depicts an exemplary embodiment of an exemplary status box enhancing web page content, which may include, in an exemplary embodiment, status information on friends, status information on stars, reputation icons, links to users, links to recent comments, etc.; a What's Hot Box providing easy linking to most read stories, etc., according to an exemplary embodiment.
Figure 19B:
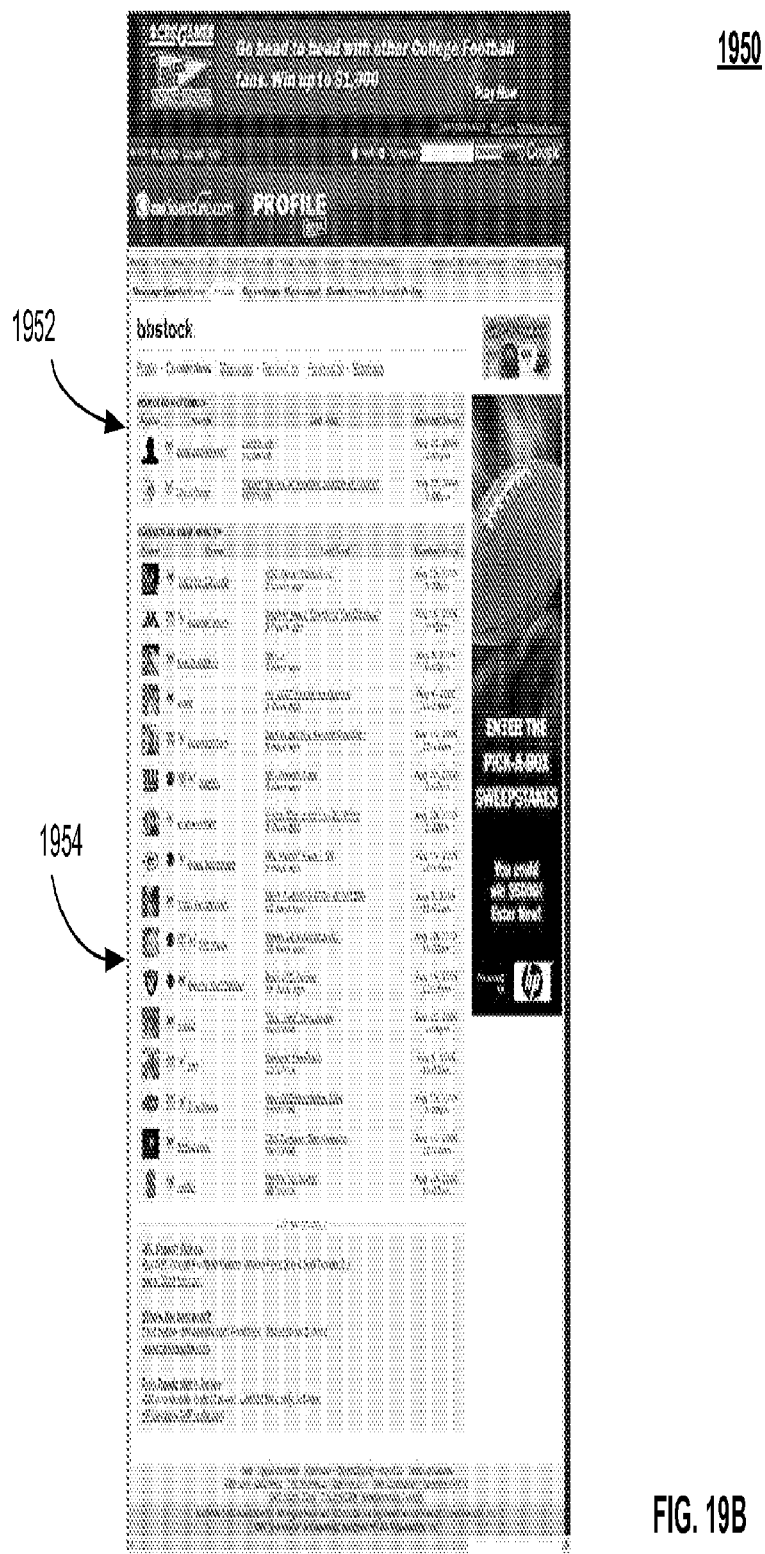
FIG. 19B depicts an exemplary embodiment of an exemplary connections webpage according to an exemplary embodiment including, e.g., listing exemplary members referred by a user, and/or members choosing the user as a favorite, etc., according to an exemplary embodiment.

According to an exemplary embodiment, from the Profile page the user may also be able to view members referred by 1952, and/or who have added the user as their favorite 1954 by clicking a "Connections" link as illustrated in exemplary webpage 1950 of FIG. 19B, according to an exemplary embodiment. The user can access an archive of all the messages that the user may have posted by clicking the "Messages" link (see, e.g., FIG. 15A). All the reviews the user may have given and the reviews the user may have received can be accessed by clicking on the "Reviews by" (see, e.g., FIG. 15B) and "Reviews to" (see, e.g., FIG. 15C) links, respectively.

Figure 20:
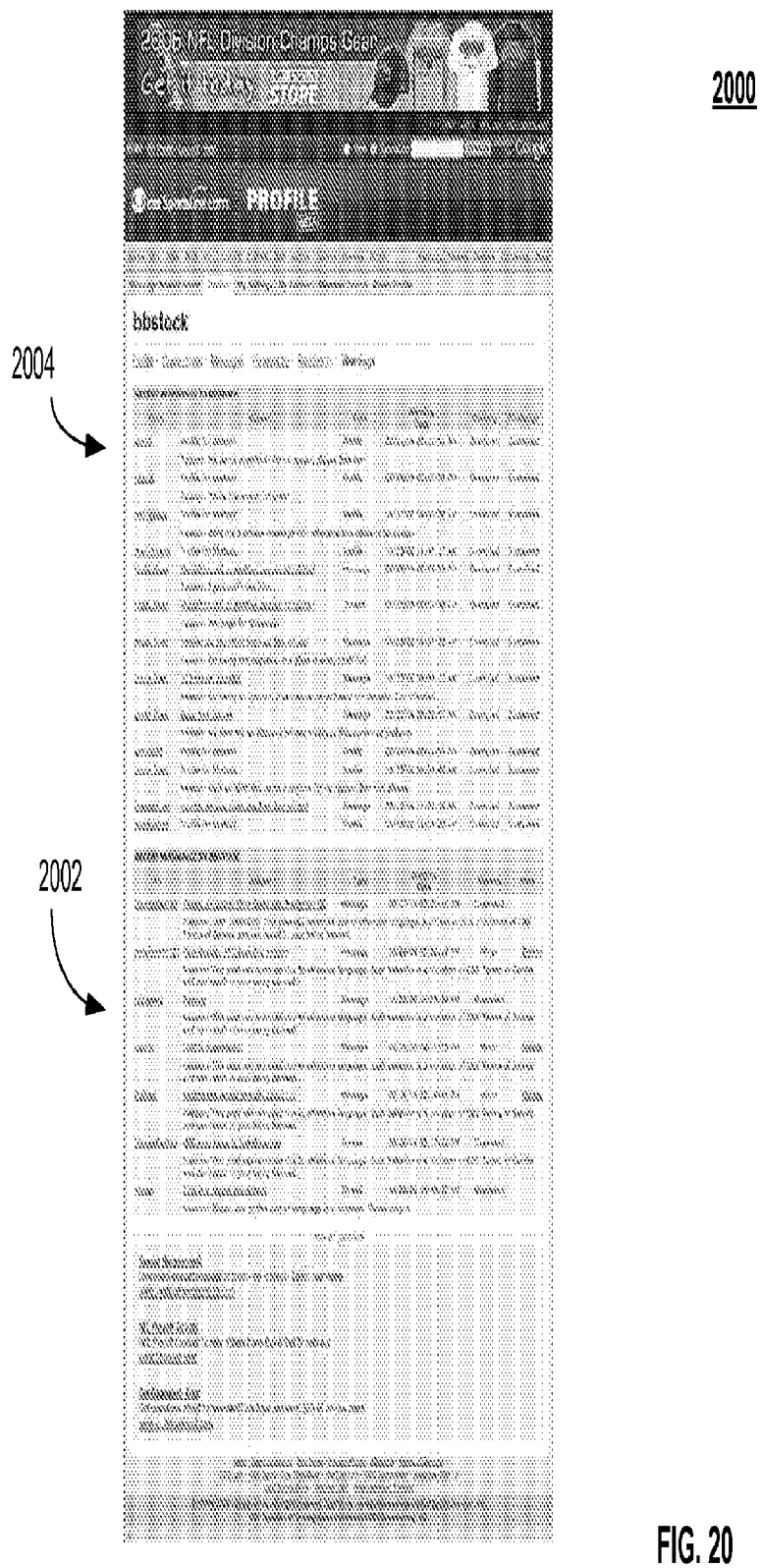
FIG. 20 depicts an exemplary embodiment of an exemplary warnings webpage according to an exemplary embodiment including, e.g., but not limited to, warnings to a user, and/or warnings by the user, etc., according to an exemplary embodiment.

According to an exemplary embodiment, the user may have access to, e.g., but not limited to, all, the warnings the user may have given 2002 and the warnings that the user may have received 2004 by selecting the "Warnings" link as illustrated in an exemplary embodiment of webpage 2000 of FIG. 20. According to an exemplary embodiment, on the "Warnings" page the user may have the ability to challenge any warnings that the user may have received. If the warning the user may have received was reviewed and deemed as bogus, the user's challenge may be sustained; however if the warning is deemed as valid, the user's challenge may be denied.

For further details explaining the impacts of warnings, see the Warning Rules section according to an exemplary embodiment.

For a user to get more details on what constitutes a valid warning, the user may be referred to an Acceptable Use Policy, or the like.

According to an exemplary embodiment, whenever a user may post a message, rate a post, or review a message, the user's Screen Name may be hyperlinked from that content. According to an exemplary embodiment, other members may view the user's profile by clicking on the user's Screen Name.

According to an exemplary embodiment, only active members of the community can reply to, rate, add a member to the their favorite list or report another member or their contributions.

According to an exemplary embodiment, members can view a user's Profile page and from it they can add the user to their "Favorite Members" list or warn the user based on content the user may have on the user's Profile page. The members may be prevented from having the ability to see your private information.

Exemplary Reputation's Exemplary Five Levels

According to an exemplary embodiment, there may be three types of icons that may appear in front of a community member's Screen Name. According to an exemplary embodiment, there may be a reputation level icon, which every community member may have; a top member icon, for the top members in the community; and the CBS SportsLine staff icon, indicating official CBS SportsLine.com employees, according to an exemplary embodiment. See, e.g., FIGS. 17A and 17B for an exemplary embodiment of exemplary illustrations of exemplary reputation category levels 1700, 1750.

According to an exemplary embodiment, an exemplary Reputation level icon may include the following:

There may be, e.g., but not limited to, five (5) levels 1702-1710, or 1752-1760 within the CBS SportsLine community which may indicate a member's overall reputation in the community according to an exemplary embodiment. Each level of a user's reputation may be denoted by a name and an icon. According to an exemplary embodiment, an exemplary five levels along with the requirements and benefits for each, follow:

Amateur 1752, (exemplary Requirements: Registered Community Member, Overall Reputation Rating of 0 to 24), (Benefits: Yellow shield, Profile page, Post messages, Select your avatar, Add favorite members, Rate content);

Rookie 1754, (exemplary Requirements: Registered Community Member, Overall Reputation Rating of 25 to 49), (Benefits: Green shield, Profile page, Post messages, Select your avatar, Add favorite members, Rate content, PLUS Create message board threads, Create message board polls);

Pro 1756, (exemplary Requirements: Registered Community Member, Overall Reputation Rating of 50 to 79), (Benefits: Blue shield, Profile page, Post messages, Select your avatar, Add favorite members, Rate content, Create message board threads, Create message board polls, PLUS Add smileys (e.g., ☺, etc.), and images to the user's posts (according to an exemplary embodiment, images can only be pulled from CBSSportsLine.com, CBS.com, CBSNews.com, and TheShowBuzz.com);

Allstar 1758, (exemplary Requirements: Registered Community Member, Overall Reputation Rating of 80 to 94), (Benefits: Silver shield, Profile page, Post messages, Select your avatar, Add favorite members, Rate content, Create message board threads, Create message board polls, Add smileys (e.g., ☺, etc.) and images to the user's posts (according to an exemplary embodiment, images can only be uploaded from CBSSportsLine.com, CBS.com, CBSNews.com, and TheShowBuzz.com), PLUS Upload the user's own avatar;

Superstar 1760, (exemplary Requirements: Registered Community Member, Overall Reputation Rating of 95 to 100), (Benefits: Gold shield, Profile page, Post messages, Select your avatar, Add favorite members, Rate content, Create message board threads, Create message board polls, Add smileys (e.g., ☺, etc.) and images to the user's posts (according to an exemplary embodiment, images can only be uploaded from CBSSportsLine.com, CBS.com, CBSNews.com, and TheShowBuzz.com), Upload your own avatar, PLUS Create your own Blog, etc.; etc.

Exemplary Top Member Icons

According to an exemplary embodiment, top members in the community may be recognized. According to an exemplary embodiment, their Screen Names may be displayed with their icon level as well as an additional icon denoting their standing. According to an exemplary embodiment, Members that may receive this additional icon may be members in the community that are in, e.g., but not limited to, the Top 10, Top 100, Top 1000, etc.

Exemplary Staff-Exemplary CBS SportsLine Staff Icon

According to an exemplary embodiment, staff, such as, e.g., but not limited to, CBS SportsLine staff 1904 (see FIG. 19A for an exemplary embodiment) may be denoted by an additional icon, such as, e.g., but not limited to, a trademark such as, e.g., the CBS eye logo. Therefore, the staff Screen Names may be presented with an authentic CBS eye logo, in addition to their level icon and their top member standing, (i.e., if the staff are indeed among the top members in the community).

Reputation's Exemplary Four Factors

According to an exemplary embodiment, an exemplary, but non-limiting four (4) Factors may be used for assessment. Of course a different number could be also used.

According to an exemplary embodiment, Member Reputation may be a ranking of a user's contributions to the CBS SportsLine community. The user's Member Reputation may reflect the user's interaction with other members of the community and the other member's assessment of the user and the user's input.

The interactions may be scored, according to an exemplary embodiment, along Four exemplary Factors, which may combine to form a user's Overall Reputation Rating. The Overall Reputation Rating, in turn, may determine the user's CBS SportsLine Community Level such as, e.g., but not limited to: an Amateur to start, then a Rookie, followed by a Pro, an Allstar, and a Superstar, according to an exemplary embodiment.

According to an exemplary embodiment, with each level of interaction may come a greater level of permissions and benefits allowing a user greater creativity and influence across the community.

According to an exemplary embodiment, a user's Overall Reputation Rating may be made up of these exemplary, but non-limiting Four Factors: 1) Connections, 2) Value, 3) Participation, and/or 4) Skills, etc. See Table 3 above, for an exemplary embodiment.

According to an exemplary embodiment, the user's scores in each of these core areas may be combined to determine the user's Community Level.

According to an exemplary embodiment, it may be possible to have a relatively high Overall Reputation Rating based on a high rating in only one or two of the exemplary Four Factors; however, it may be highly unlikely that the user may reach the highest of the exemplary Five Levels illustrated in FIGS. 17A and 17B, in an exemplary embodiment. Each factor may have a maximum number of points available; therefore doing extremely well in only one area may not compensate for the areas in which a user may be lacking According to an exemplary embodiment, the Four Factors as set forth in exemplary Table 3, may include the following:

1) Connections: A user's Connections Rating may represent drawing power and sphere of influence. This rating may essentially include a number of members who have saved your profile as one of their Favorite Members as well as the number of new members who have joined as a result of your contributions to the CBS SportsLine community. As an added kicker, being added as a Favorite Member by a member with a high Overall Reputation Rating may provide greater impact to your Connections score than being added by a member with a lower Reputation Rating;

2) Value: A user's Value Rating may represent the sum of ratings that other members have given the user's contributions. Similar to the Connections Rating, the user's Value Rating may be positively influenced by a rater whose Reputation Rating is high. The higher that member's reputation, the bigger the impact to the user's Value Rating;

3) Participation: A user's Participation Rating may be assigned based upon the number and frequency of the user's participation with CBS SportsLine. The more active the user may be on message boards, in the games arena, with fantasy leagues and in contests—the higher the user's rating may be. However, the quality of the user's submissions may also be high to get the greatest impact to the Overall Reputation Rating;

4) Skills: A user's Skills Rating may represent how well the user may perform in games of knowledge and skills. These games may include Fantasy games as well as Trivia games such as, e.g., but not limited to, Trivia Tower™ and CBS® Games ratings, etc.

According to an exemplary embodiment, there may be several exemplary ways to improve a user's Overall Reputation Rating as illustrated, e.g., in FIG. 16C in exemplary webpage 1660, which may include, e.g., but not limited to: posting content with a perceived high quality to the message boards; objectively rating others' content; adding high Reputation members to a user's favorites list; inviting friends who are not already community (e.g., SportsLine) members to become a part of the community; entering contests; visiting the site frequently; signing up for fantasy games; playing casual games; and/or testing your knowledge with games/trivia/etc., e.g., Trivia Tower.

According to an exemplary embodiment, things that may hurt a user's reputation may include, e.g., but not limited to: infrequently visiting the site; infrequently submitting to the message boards; rating content in a haphazard or contrary manner; not participating in other community activities such as, e.g., but not limited to, gaming, fantasy and/or contests, etc.; using offensive language when interacting with the community (e.g., CBS SportsLine community), etc.

According to an exemplary embodiment, it may be important to maintain a good score in all Four Factors for a user to benefit the most from the user's interaction with the CBS SportsLine community. Keeping a user's score up and maintaining a high Reputation Level with the CBS SportsLine community may keep the user and the user's contributions at the head of the line.

Exemplary Warning System

According to an exemplary embodiment, a warning system may be provided to the reputation engine. According to an exemplary embodiment, the SportsLine Message Board Warning System may provide members the ability to identify and reduce misbehavior on the CBS SportsLine Message Boards.

According to an exemplary embodiment, a warning may not be used for personal attacks or "warning wars" with other members. According to an exemplary embodiment, members who abuse the warning system may risk Member Reputation deductions and Banning from the community, according to an exemplary embodiment.

According to an exemplary embodiment, the Warning System may feature a warning submission page, which according to an exemplary embodiment, may have a text entry box to provide the reason for the warning submitted. According to an exemplary embodiment, the Warning System may also allow members to review warnings that the member may have been given by clicking the "Warnings" link located on the user's Profiles. See FIG. 20 and exemplary warnings webpage 2000, according to an exemplary embodiment.

According to an exemplary embodiment, a member may challenge a warning by selecting the "Challenge Warning" link. By doing so, the warning and challenge may be routed to the CBS SportsLine Message Board Moderation team for review.

According to an exemplary embodiment, if the warning is legitimate, a challenge may be denied and the warning's impacts may be sustained.

According to an exemplary embodiment, if the challenge is upheld, the person submitting the warning may be given a Reputation deduction and may be Banned.

According to an exemplary embodiment, legitimate reasons for warning another member may include the use of offensive or obscene language, links to offensive or obscene images, personal attacks, racist characterizations, ethnic slurs, sexist commentary, pornographic content and/or commercial advertising, etc.

According to an exemplary embodiment, for a more detailed accounting of acceptable and unacceptable behavior, a user may be referred to an Acceptable Use Policy.

According to an exemplary embodiment, CBS SportsLine may review all such submissions and may levy Reputation deductions or Ban a member for violations.

According to an exemplary embodiment, bad logic, ignorance and selective memory may all be prevalent on Message Boards. None of these are valid reasons to warn another member. If a message is poorly written or poorly thought out, users should use the Rating System to assign an appropriate value to the post. Users should note that such posts do not warrant warning another member.

According to an exemplary embodiment, a warning system, such as, e.g., but not limited to, the CBS SportsLine Warning System, may limit a member's Reputation levels in the following exemplary, but non-limiting ways:

1 to 2 Warnings in the last 3 months: Maximum Level may be All-Star;

3 to 4 Warnings in the last 3 months: Maximum Level may be Pro; and/or 5 to 9 Warnings in the last 3 months: Maximum Level may be Rookie; etc.

According to an exemplary embodiment, the above may represent an automated system's response to a Warning. In most cases, repeated and justified Warnings may result in a member being Banned.

According to an exemplary embodiment, insubstantial Warnings (Warnings that are Challenged and Upheld) may result in a=Warning deduction.

According to an exemplary embodiment, the warning system may provide a tool for the community to monitor itself. The goal may be to create an environment where fans of various tastes and backgrounds can feel comfortable reading and submitting.

Figure 11A:
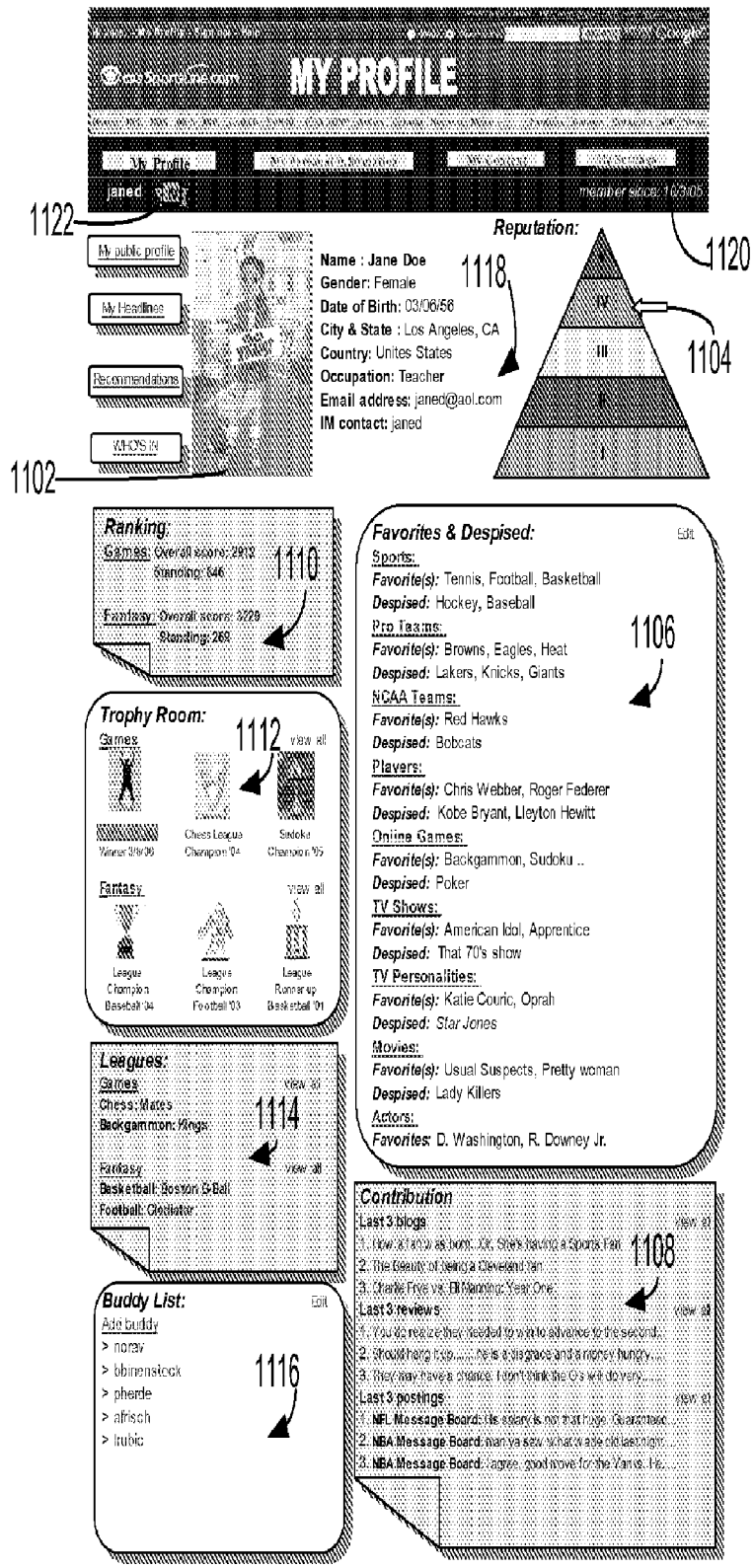
FIGS. 11A and 11B depict exemplary embodiments of an exemplary My Profile page for exemplary users, including an exemplary All Star (FIG. 11B), enabling an exemplary Reputation Engine system according to an exemplary embodiment.
Figure 11B:
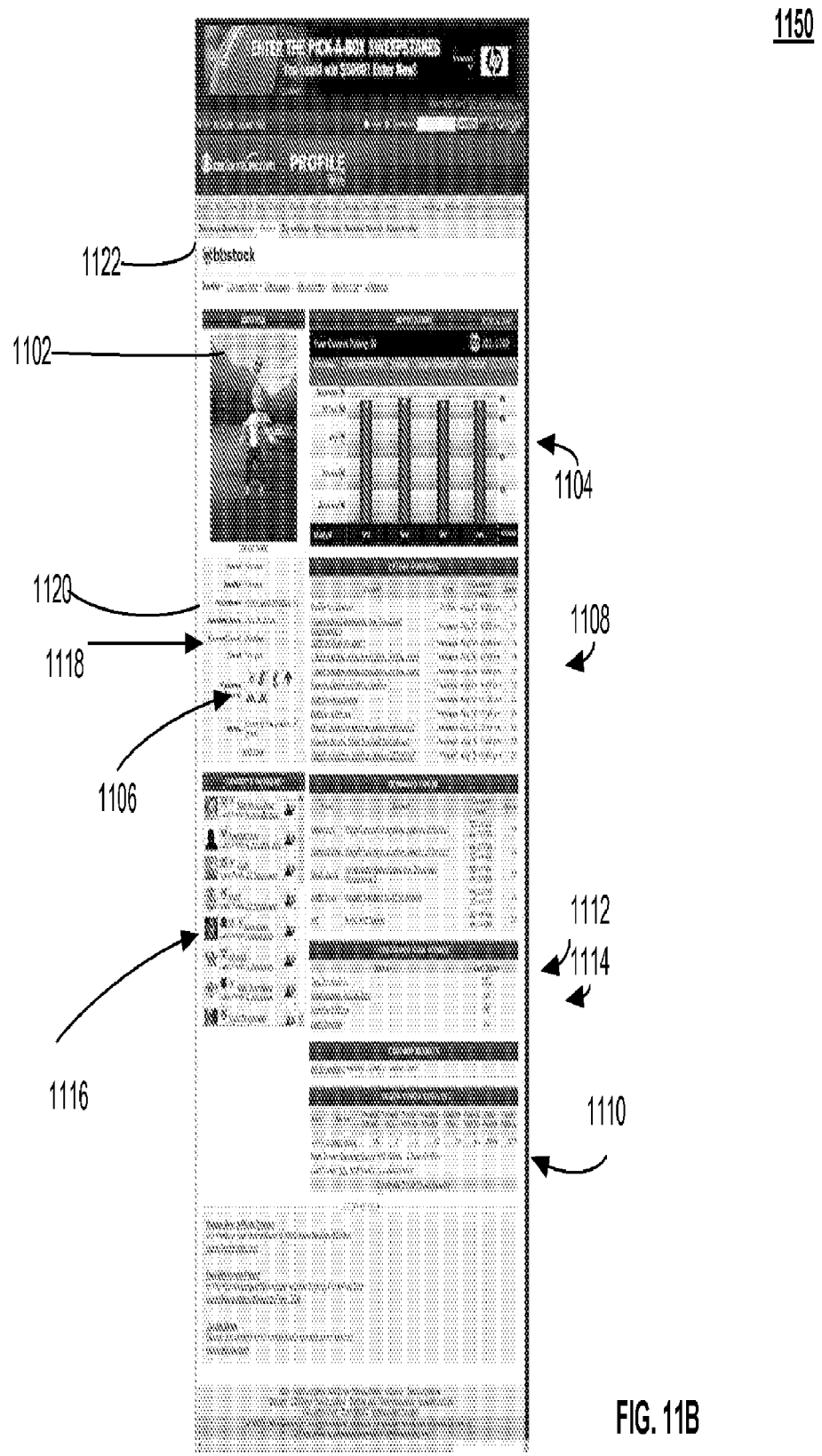

FIG. 11A depicts an exemplary embodiment of an exemplary My Profile page 100 for enabling a Reputation Engine system according to an exemplary embodiment. According to an exemplary embodiment, the profile page may include, e.g., but not limited to, an avatar 1102, a reputation indication 1104, a user's favorites and/or despised 1106, recent contributions 1108 (or all contributions), ranking 1110, trophy room, 1112, leagues 1114, buddy list 1116, personal information about the user 1118 (which may not be publicly viewable as a default, for example), member since date 1120, and/or reputation icon 1122, etc. FIG. 11B depicts exemplary embodiments of an exemplary webpage 1150 My Profile page for exemplary users, including an exemplary All Star 1758, enabling an exemplary Reputation Engine system indication 1104 according to an exemplary embodiment.

Figure 12:
FIG. 12 depicts an exemplary embodiment of an exemplary My Personal Information portion of an exemplary My Profile page for proving a central point of access for a member profile and for enabling an exemplary Reputation Engine system according to an exemplary embodiment.

FIG. 12 depicts an exemplary embodiment of an exemplary My Personal Information portion 1200 of an exemplary My Profile page for proving a central point of access for a member profile, allowing a user to fill in and update personal information, address information, password information, phone number, instant message, email address, gender, occupation, billing, income, etc. information, including whether particular information may be made public, or not. In an exemplary embodiment, the user may review purchase history, update or add any information to the user's profile. In an exemplary embodiment, the profile may be shared by multiple websites, such as, e.g., multiple related websites, and/or websites subscribing to a common profile and/or Reputation Engine system according to an exemplary embodiment of the present invention.

Figure 13:
FIG. 13 depicts an exemplary embodiment of an exemplary My Profile page for enabling a user to manage, e.g., but not limited to, subscriptions, choose site settings, display settings, communication devices, buddy list, favorites, sponsors, personal calendar and avatar settings to enable the Reputation Engine system according to an exemplary embodiment.

FIG. 13 depicts an exemplary embodiment of an exemplary My Profile page 1300 enabling a user to manage, e.g., but not limited to, subscriptions 1301, choose site settings, display settings 1306, communication device settings 1304, buddy list 1310, favorites and/or despised 1314, sponsors 1308, personal calendar and/or planner 1312 (which may include customized information based on the user profile) and avatar settings 1316, groups 1318, etc. Any superset or subset of these features may be made available to a user, including making some features optional, editable, added, and/or removed.

Figure 14:
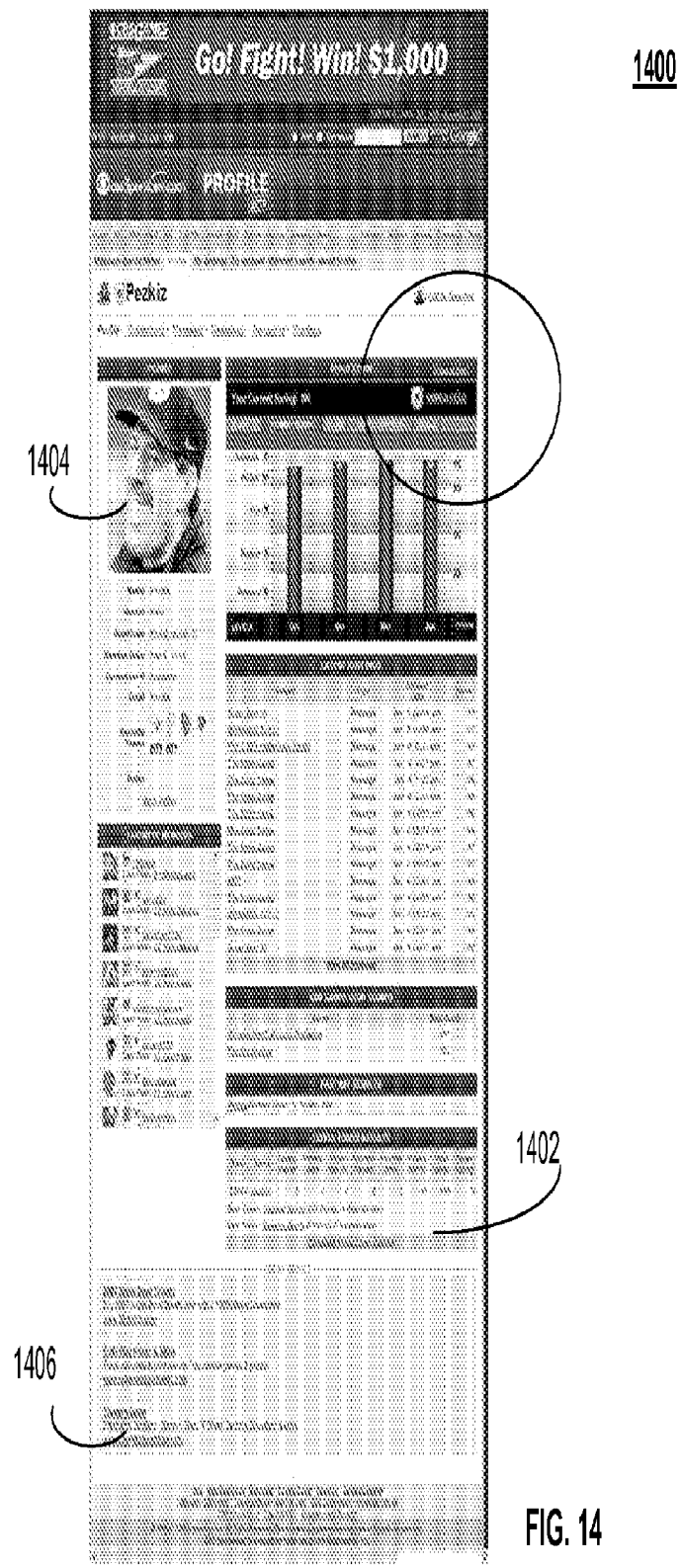
FIG. 14 depicts an exemplary embodiment of an exemplary My Profile page for an exemplary Super Star, for enabling viewing of exemplary content, such as, e.g., but not limited to, contests, exemplary avatar, an exemplary photogallery, and/or exemplary recommendations, etc. and enabling an exemplary Reputation Engine system according to an exemplary embodiment.

FIG. 14 depicts an exemplary embodiment of an exemplary My Profile page 1400 enabling additional exemplary features including, e.g., but not limited to, exemplary contests 1402, an exemplary photo gallery 1404, exemplary recommendations 1406, etc., according to an exemplary embodiment.

Figure 15A:
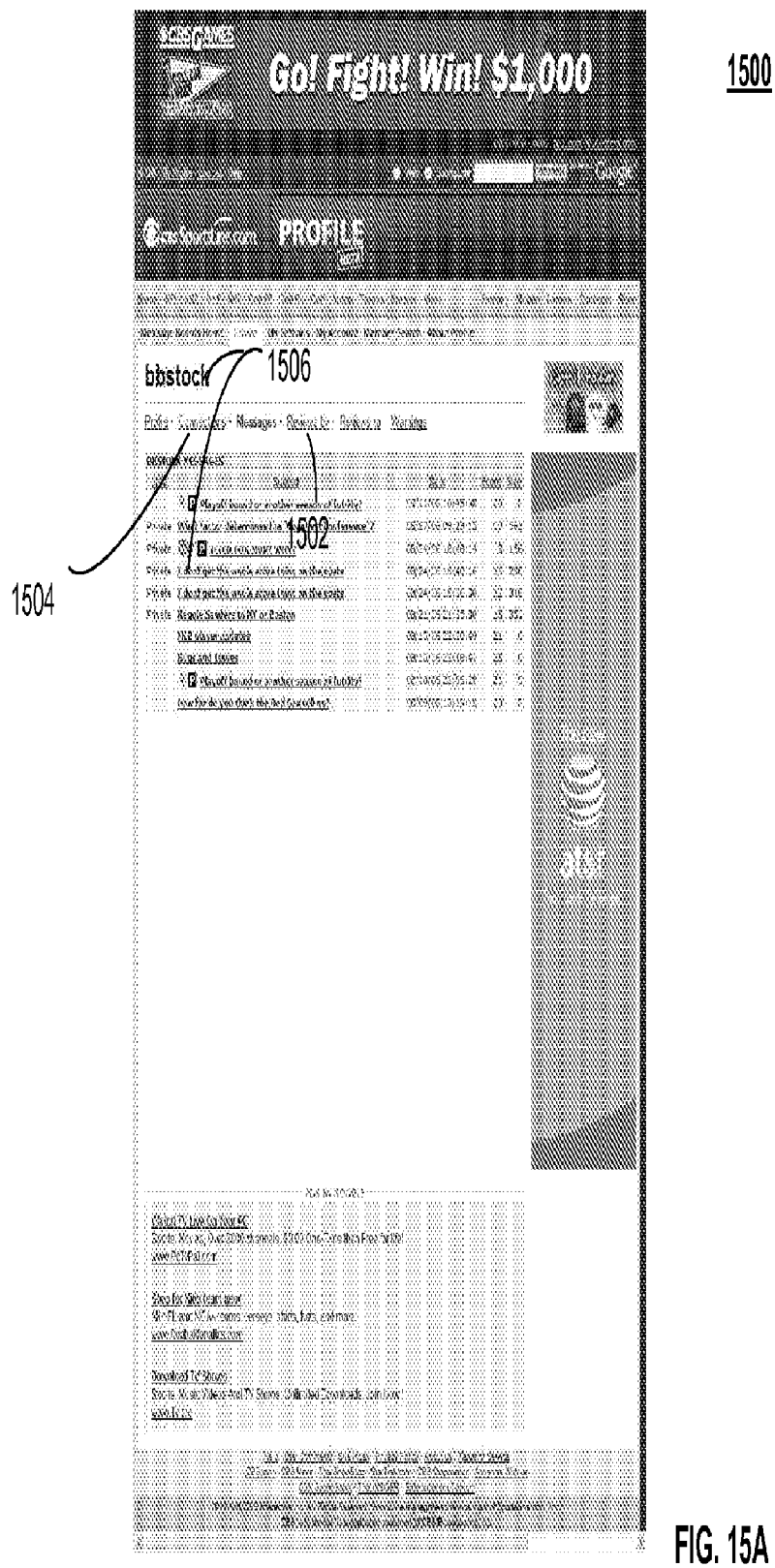
FIGS. 15A-15C depict exemplary embodiments of exemplary My Profile components which may include, in an exemplary embodiment, exemplary connections, messages (FIG. 15A), reviews by (FIG. 15B), reviews to (FIG. 15C), which in exemplary embodiments may include, a number of reviews written, community features, which may include message boards, top reviewers, groups, rankings, etc. for enabling an exemplary Reputation Engine system according to an exemplary embodiment.
Figure 15B:
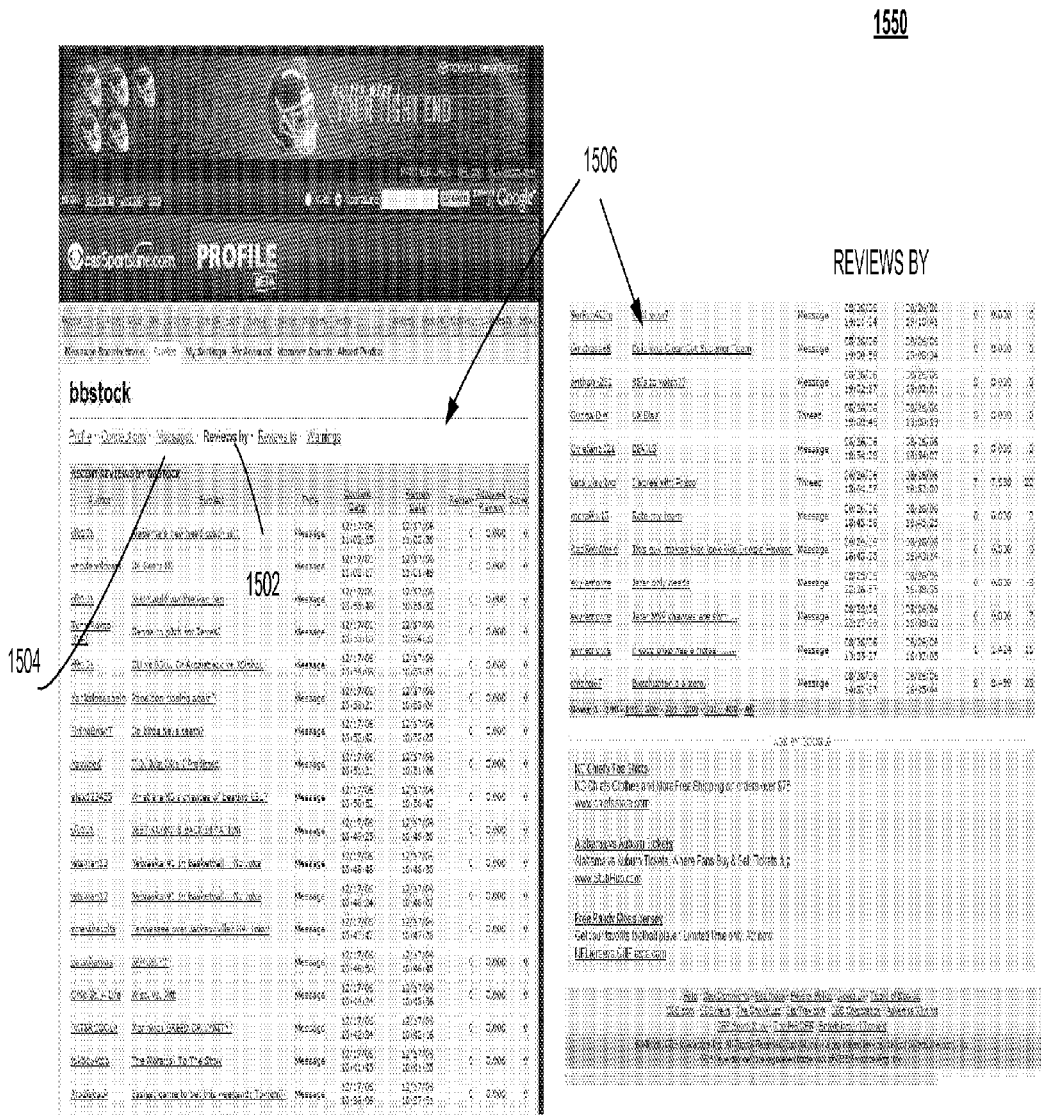
Figure 15C:
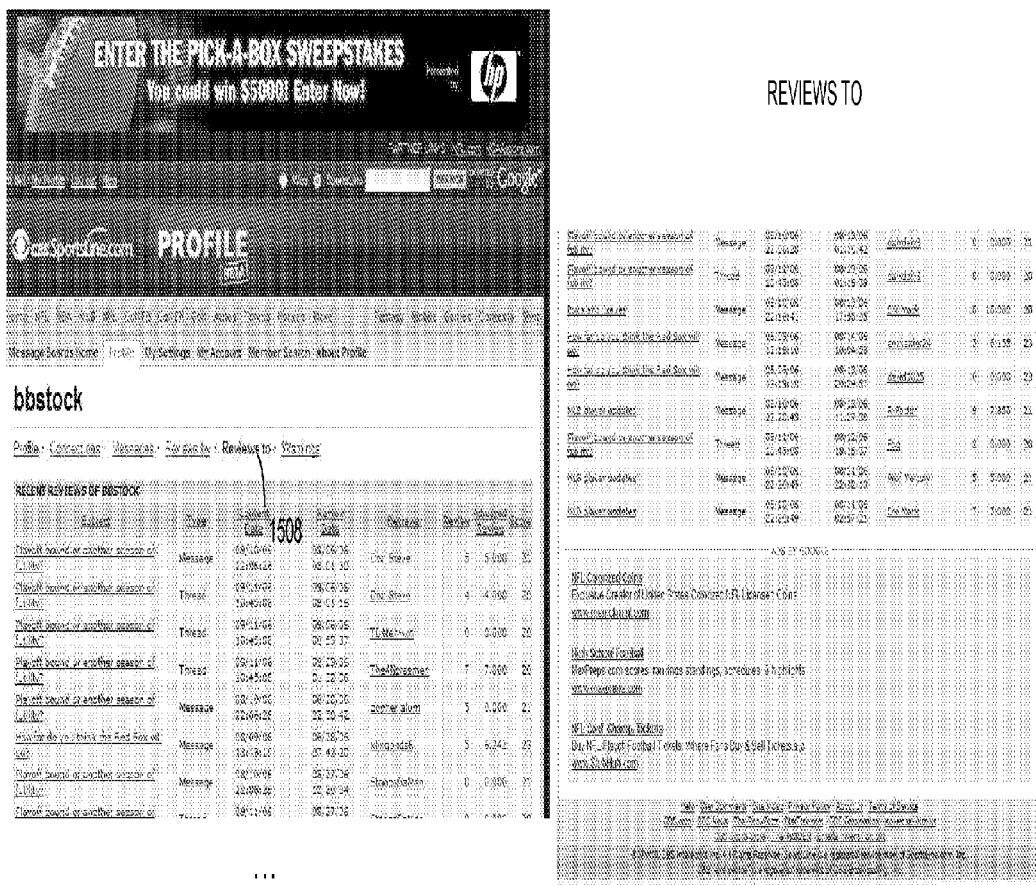

FIG. 15A depicts an exemplary embodiment of exemplary My Profile components 1500 which may include a number of reviews written by 1502 a user 1506 about content, such as posts, articles, books, etc., community features such as, for example, connections 1504, which may include message boards, top reviewers, groups, rankings, etc. according to an exemplary embodiment. See above regarding FIGS. 15B and 15C and reviews by and review to, respectively.

FIG. 16A depicts an exemplary embodiment of an exemplary amateur 1616 Public Profile page 1600 for enabling automatic public viewing of default information (such as, e.g., but not limited to, Member ID, Reputation, Member Category Level, Favorites and Despised, High Scores in Games, Fantasy Ranking, Trophy Room, and/or the user's Member Created Content, etc.), and optional viewing of other information (such as, e.g., but not limited to, first name, last name, e-mail address, city, state, gender, occupation, Buddy List, etc.), as may be made public by the user if opted in by a user, according to an exemplary embodiment. Webpage 1600 includes banner ad 1620 and contextual link ads 1618. See above regarding FIGS. 16B and 16C representing a rookie and a pro, respectively.

FIG. 17A depicts an exemplary embodiment of an exemplary table 1700 of exemplary Member Reputation Categories and exemplary category icons, according to an exemplary embodiment. See FIG. 17B above.

Figures 18A, 18B:
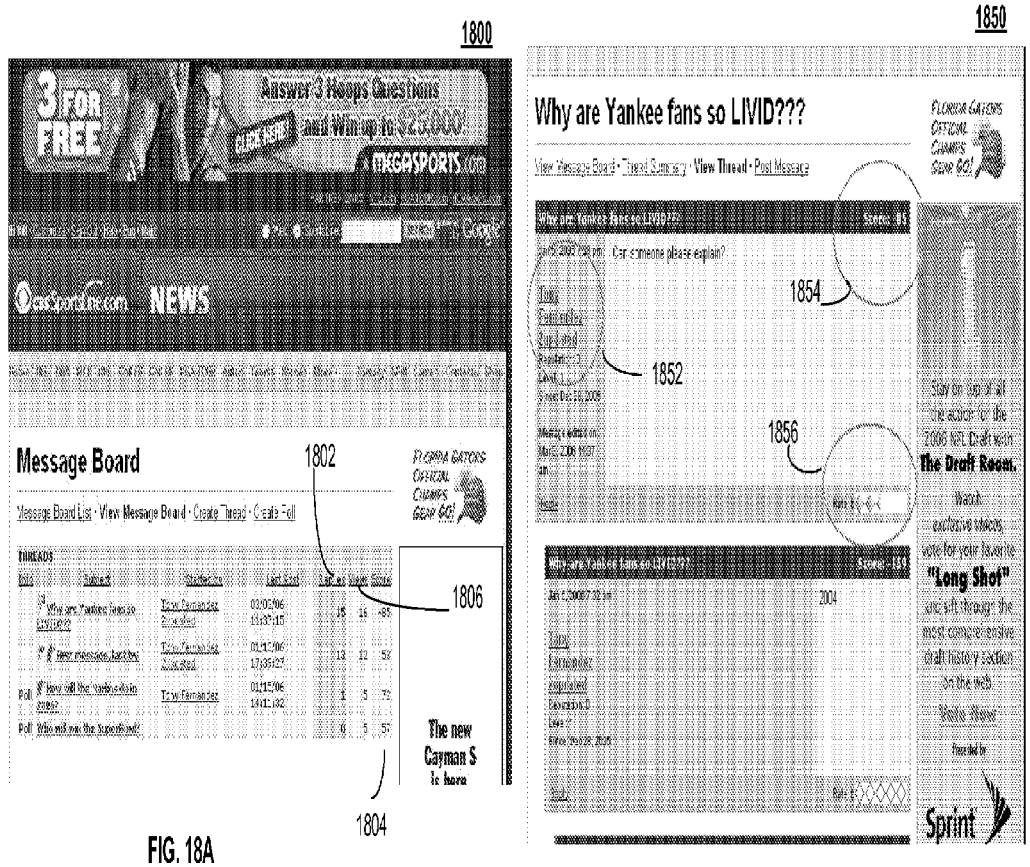
FIG. 18A depicts an exemplary embodiment of an exemplary enhanced Message Board allowing consumer scoring of posts, which may include numbers of replies, numbers of views, a score for an interaction, etc., according to an exemplary embodiment.
FIG. 18B depicts an exemplary embodiment of an exemplary enhanced Message Board allowing viewing of consumer scoring of posts, which may include a score for a post, a graphical user interface rating button, a link to a poster's profile, reputation information on a poster, a level of a poster, replies, etc., according to an exemplary embodiment.

FIG. 18A depicts an exemplary embodiment of an exemplary enhanced Message Board 1800 allowing consumer scoring of posts, which may include numbers of replies 1802, numbers of views of a comment 1806, a score for an interaction or comment 1804, etc., according to an exemplary embodiment.

FIG. 18B depicts an exemplary embodiment of an exemplary enhanced Message Board 1850 allowing viewing of consumer scoring of posts, which may include a score for an post 1854, a graphical user interface rating button 1856, a link to a poster's profile 1852, reputation information on a poster, a level of a poster, replies, etc., according to an exemplary embodiment.

Figure 18C:
FIG. 18C depicts an exemplary embodiment of an exemplary Message Board for an exemplary topic, allowing exemplary scoring of posts, which may include, in an exemplary embodiment, numbers of replies, numbers of views, a score for an interaction, etc., according to an exemplary embodiment.

FIG. 18C depicts an exemplary embodiment of a webpage 1860 of an exemplary Message Board for an exemplary topic, allowing exemplary scoring of posts 1804, which may include, in an exemplary embodiment, numbers of replies 1802, numbers of views 1806, a score 1804 for an interaction, etc., according to an exemplary embodiment.

Figure 18D:
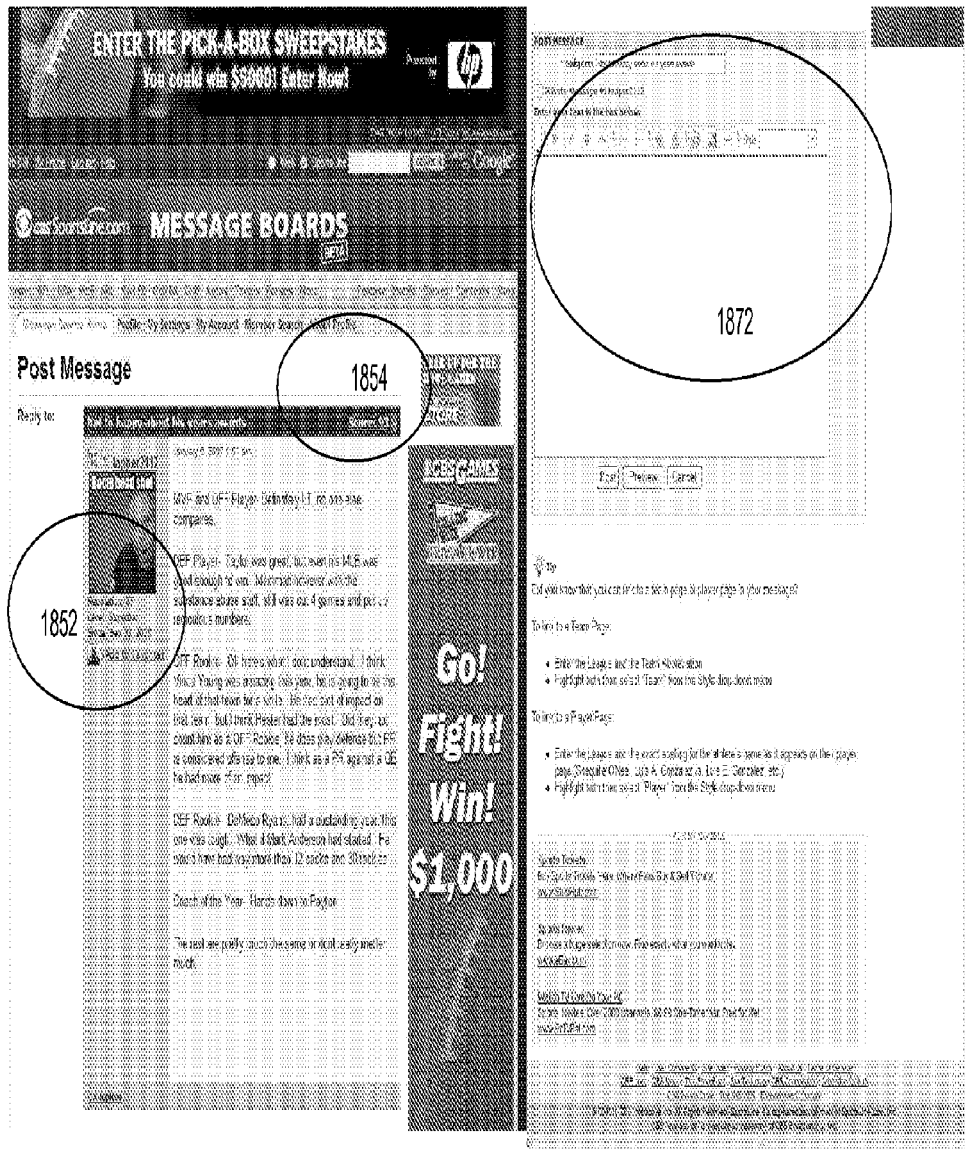
FIG. 18D depicts an exemplary embodiment of an exemplary webpage for posting a message according to an exemplary embodiment.

FIG. 18D depicts an exemplary embodiment of an exemplary webpage 1870 for posting a message according to an exemplary embodiment, which may include, in an exemplary embodiment, a post which may include a score 1854, information about the poster 1852, such as, e.g., but not limited to, reputation information, and a message window for creating a post 1872, with exemplary features according to an exemplary embodiment.

Figure 18E:
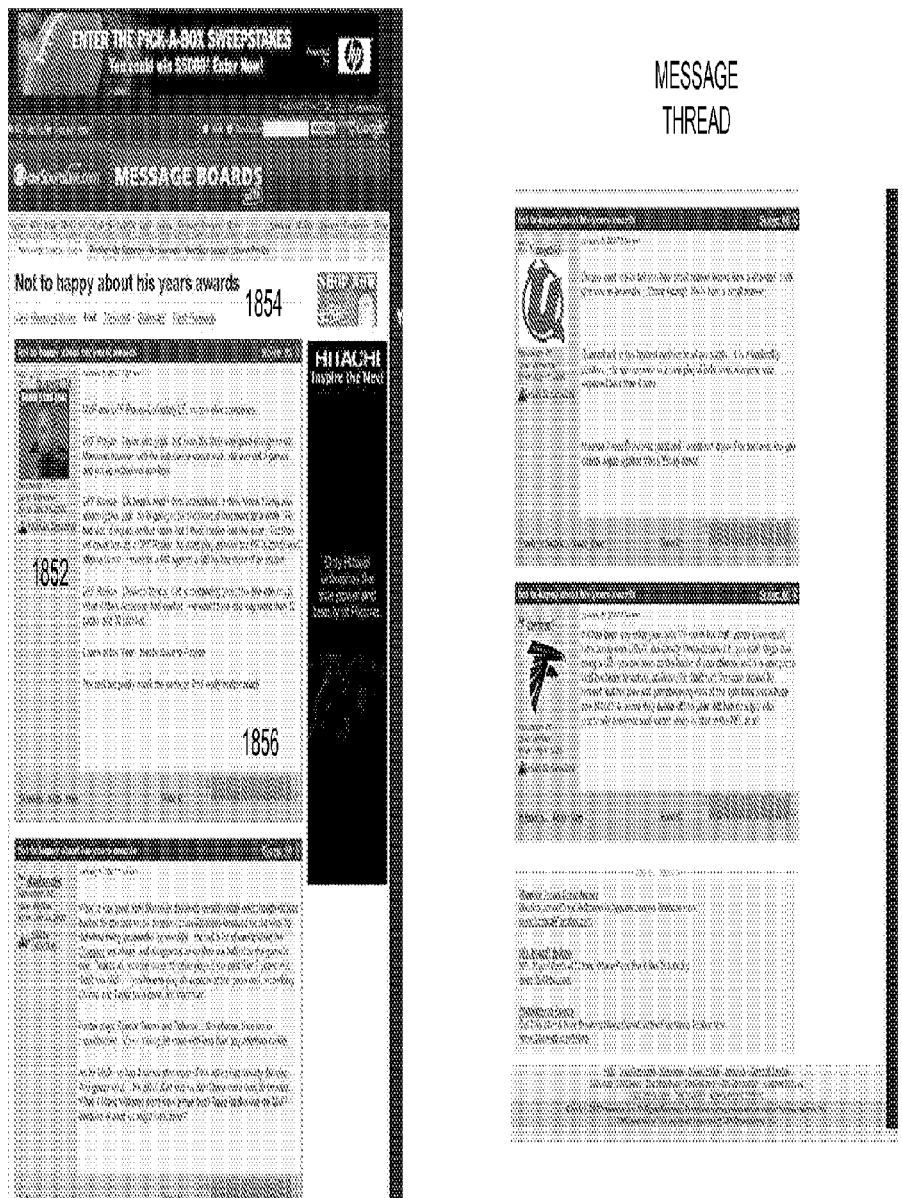
FIG. 18E depicts an exemplary embodiment of exemplary Message postings illustrating exemplary ratings, scores, etc. according to an exemplary embodiment.

FIG. 18E depicts an exemplary embodiment of an exemplary webpage 1880 illustrating exemplary Message postings thread (not labeled) illustrating exemplary ratings 1856, scores 1854, poster information 1852, etc. according to an exemplary embodiment.

FIG. 19A depicts an exemplary embodiment of enhanced content 1900 of an exemplary status box 1902 enhancing web page content, which may include, in an exemplary embodiment, status information on friends 1906, status information on stars 1906, reputation icons 1908, links to users, links to recent comments, etc.; a What's Hot Box 1910 providing easy linking to most read stories, etc., according to an exemplary embodiment.

FIG. 19B depicts an exemplary embodiment of an exemplary connections webpage 1950 according to an exemplary embodiment including, e.g., listing exemplary members referred 1952 by a user, and/or, members choosing 1954 the user as a favorite, etc., according to an exemplary embodiment.

FIG. 20 depicts an exemplary embodiment of an exemplary warnings webpage 2000 according to an exemplary embodiment including, e.g., but not limited to, warnings by the user 2002, and/or warnings to a user 2004, etc., according to an exemplary embodiment.

According to an exemplary embodiment of the present invention, consumers may receive an improved user experience. According to an exemplary embodiment of the present invention, advertisers may be able to access users while they are waiting to gain entry to an event. A broadcasting, or media company may be able to better manage advertising inventory. Advertising is often tied to subscription commitments, so knowing more clearly how many users may be expected may allow for more intelligence, greater intelligence may be gleaned from changed consumer behavior, improved commitment fulfillment may be achieved, and since viewers are tiered by access level, advertising may be directed to groups, and may be customized by access level. According to an exemplary embodiment, content providers and/or content distributors may be able to better plan bandwidth capacity.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. An online access method comprising:
providing by a processor an online waiting room for an online event;
calculating a reputation level for a registered user in an online community;
placing the registered user in one of a plurality of standby lines, wherein each of the plurality of standby lines is associated with a different reputation level; and
providing a graphical representation by said processor of at least two of the plurality of standby lines, the graphical representation being computer-viewable by the registered user in a first standby line, the graphical representation further providing an indication to the registered user waiting in the first standby line of where in another of the standby lines the registered user would have been had the registered user had a different reputation level at the time the registered user was placed in the first standby line.

2. The method according to claim 1, wherein calculating a reputation level comprises:
calculating at least one score from the registered user's contributions to the online community, the at least one calculated score comprising at least one of: a connections score, a value score, a participation score, or a skills score.

3. The method according to claim 2, comprising:
combining the at least one calculated score to determine a reputation level.

4. The method of claim 2, comprising:
calculating a connections score from at least one of:
- a number of members of the online community who have indicated that the registered user is a favorite member;
- a number of new members who have joined the online community as a result of the contributions of the registered user to the online community; or
- the reputation level of a member who has added the registered user as a favorite member, where a high reputation level of the member increases the registered user's connections score more than a lower reputation level of the member.

5. The method of claim 2, comprising:
calculating a values score from at least one of:
- a sum of ratings that other members have given the registered user's contributions; or
- the reputation level of a member who has rated the registered user's contributions, where a high reputation level of the member increases the registered user's connections score more than a lower reputation level of the member.

6. The method of claim 2, comprising:
calculating a participation score from at least one of:
- a number of the registered user's contributions to the online community; or
- a frequency of the registered user's contributions to the online community.

7. The method of claim 6, comprising:
weighting the participation score according to a quality of the registered user's contribution as determined by ratings of the contributions.

8. The method of claim 2, comprising:
calculating a skills score from the registered user's performance in at least one of: games of knowledge, games of skill, contests, or fantasy games.

9. The method according to claim 1, wherein the reputation level is associated with one of: amateur, rookie, pro, allstar, and superstar levels.

10. The method of claim 9, comprising:
- providing a capability of an immediate reserved access to the online event to a registered user in a standby line associated with a superstar reputation level;
- providing a capability of a medium level access to the online event to a registered user in a standby line associated with a pro reputation level; and
- providing a capability of a lower level of access to the online event to a registered user in a standby line associated with an amateur reputation level.

11. The method of claim 1, wherein the online event comprises at least one of:
- on-demand broadband access to streaming video of a sporting event;
- online access to at least one of: a sporting event, an entertainment event, or a news event;
- a game;
- a game without consideration;
- a game of skill;
- a game of chance;
- a game of knowledge; or
- a massively multiplayer online (MMO) game.

12. An apparatus comprising:
- a processor;
- a reputation engine executing on the processor to calculate a reputation level for a registered user in an online community;
- an online waiting room executing on the processor to:
  - provide an online waiting room for an online event;
  - symbolically place the registered user in one of a plurality of standby lines, wherein each of the plurality of standby lines is associated with a different reputation level;
  - control access to the online event by the registered users in accordance with rules associated with each of the plurality of standby lines;
  - provide a symbolic representation indicating a placement of the registered user in the one standby line; and
  - indicate to the registered user waiting in the one standby line where in another of the standby lines the user would have been had the user had a different reputation level at the time the user joined the one standby line.

13. The apparatus of claim 12, the reputation engine further to:
- calculate at least one score from the registered user's contributions to the online community, the at least one calculated score comprising at least one of: a connections score, a value score, a participation score, or a skills score; and
- combine the at least one calculated score to determine a reputation level.

14. The apparatus of claim 13, the reputation engine further to:
calculate a connections score from at least one of:
- a number of members of the online community who have indicated that the registered user is a favorite member;
- a number of new members who have joined the online community as a result of the contributions of the registered user to the online community; or
- the reputation level of a member who has added the registered user as a favorite member, where a high reputation level of the member increases the registered user's connections score more than a lower reputation level of the member.

15. The apparatus of claim 13, the reputation engine further to:
calculate a values score from at least one of:
- a sum of ratings that other members have given the registered user's contributions; or
- the reputation level of a member who has rated the registered user's contributions, where a high reputation level of the member increases the registered user's connections score more than a lower reputation level of the member.

16. The apparatus of claim 13, the reputation engine further to:
- calculate a participation score from at least one of:
  - a number of the registered user's contributions to the online community; or
  - a frequency of the registered user's contributions to the online community; and
- weight the participation score according to a quality of the registered user's contribution as determined by ratings of the contributions.

17. The apparatus of claim 13, the reputation engine further to:
calculate a skills score from the registered user's performance in at least one of: games of knowledge, games of skill, contests, or fantasy games.

18. A non-transitory computer-readable medium embodying logic which when executed on a computer causes the computer to:
- calculate a reputation level for a registered user in an online community;

provide an online waiting room for an online event;

symbolically place the registered user in one of a plurality of standby lines, wherein each of the plurality of standby lines is associated with a different reputation level;

control access to the online event by the registered users in accordance with rules associated with each of the plurality of standby lines;

provide a symbolic representation indicating a placement of the registered user in the one standby line; and indicate to the registered user waiting in the one standby line where in another of the standby lines the user would have been had the user had a different reputation level at the time the user joined the one standby line.

19. The computer-readable medium of claim 18, further embodying logic which when executed on a computer causes the computer to:

calculate at least one score from the registered user's contributions to the online community, the at least one calculated score comprising at least one of: a connections score, a value score, a participation score, or a skills score; and, combine the at least one calculated score to determine a reputation level.

20. The computer-readable medium of claim 18, wherein the reputation level is associated with one of: amateur, pro, and superstar levels, the medium further embodying logic which when executed on a computer causes the computer to:

provide a capability of an immediate reserved access to the online event to a registered user in a standby line associated with a superstar reputation level;

provide a capability of a medium level access to the online event to a registered user in a standby line associated with a pro reputation level; and provide a capability of a lower level of access to the online event to a registered user in a standby line associated with an amateur reputation level.

* * * * *